(12) United States Patent
Ronen et al.

(10) Patent No.: US 10,515,323 B2
(45) Date of Patent: Dec. 24, 2019

(54) OPERATIONS COMMAND CONSOLE

(71) Applicant: PagerDuty, Inc., San Francisco, CA (US)

(72) Inventors: Ophir Ronen, Seattle, WA (US); David Aaron Cooper, San Francisco, CA (US); David Allen Lax Shackelford, San Francisco, CA (US); Don Jeffrey Lopes, San Rafael, CA (US); David Robert Cliffe, Waterdown (CA); Justin David Kearns, Seattle, WA (US); George William Kucera, Rescue, CA (US); Morgan Jacob Dornbush, San Francisco, CA (US)

(73) Assignee: PagerDuty, Inc., San Francisco, CA (US)

(*) Notice: Subject to any disclaimer, the term of this patent is extended or adjusted under 35 U.S.C. 154(b) by 0 days.

(21) Appl. No.: 15/702,689

(22) Filed: Sep. 12, 2017

(65) Prior Publication Data
US 2018/0075397 A1    Mar. 15, 2018

Related U.S. Application Data

(60) Provisional application No. 62/393,542, filed on Sep. 12, 2016.

(51) Int. Cl.
*G06Q 10/00* (2012.01)
*G06Q 10/06* (2012.01)
(Continued)

(52) U.S. Cl.
CPC ... *G06Q 10/063114* (2013.01); *G06Q 10/063* (2013.01); *G06Q 10/067* (2013.01);
(Continued)

(58) Field of Classification Search
CPC .............................................. G06Q 10/063114
(Continued)

(56) References Cited

U.S. PATENT DOCUMENTS

| 5,557,747 A | * | 9/1996 | Rogers ................... H04L 41/16 709/223 |
| 6,675,128 B1 | * | 1/2004 | Hellerstein ......... H04L 41/0681 700/31 |

(Continued)

OTHER PUBLICATIONS

Chandola et al., "Anomaly detection: A survey," Journal ACM computing Surveys (CSUR), vol. 41, issue 3, Jul. 2009, Article No. 15, 58 pages.

(Continued)

*Primary Examiner* — Thomas L Mansfield
*Assistant Examiner* — Tyrone E Singletary
(74) *Attorney, Agent, or Firm* — John W. Branch; Lowe Graham Jones PLLC

(57) ABSTRACT

Embodiments are directed towards to managing operations for an organization. An operation engine may be employed to provide operations metrics based on events and resolution actions associated with an incident. Update information may be provided to console modules included in operations command consoles (OCCs) each console module may include module views. The console modules may be employed to provide data objects to the module views. The module views may be employed to provide different visualizations of the incident based on a role that may be associated with the console modules. An OCC may be employed to provide other resolution actions to the operations engine and then that operations engine may provide additional update information to the console modules based on the other resolution actions.

28 Claims, 16 Drawing Sheets

(51) Int. Cl.
*H04L 29/08* (2006.01)
*G06F 3/0481* (2013.01)
*H04L 29/06* (2006.01)

(52) U.S. Cl.
CPC ............ *H04L 67/10* (2013.01); *G06F 3/0481* (2013.01); *G06Q 10/06375* (2013.01); *H04L 67/42* (2013.01)

(58) Field of Classification Search
USPC ....................................................... 705/7.11
See application file for complete search history.

(56) References Cited

U.S. PATENT DOCUMENTS

| | | | | |
|---|---|---|---|---|
| 7,360,125 | B2* | 4/2008 | Krebs ...................... | G06F 9/453 714/48 |
| 7,464,298 | B2* | 12/2008 | Dan .................... | H04L 41/0631 714/38.14 |
| 7,490,145 | B2* | 2/2009 | Sylor ...................... | H04L 41/06 709/223 |
| 7,769,899 | B2* | 8/2010 | Grabarnik ........... | G06F 11/0709 709/223 |
| 8,140,614 | B2* | 3/2012 | Bower, III ............ | H04L 41/042 709/202 |
| 8,196,114 | B2* | 6/2012 | Diao ...................... | G06Q 10/10 706/1 |
| 8,291,268 | B2* | 10/2012 | Acuna ................. | G06F 11/0727 714/37 |
| 8,307,060 | B2* | 11/2012 | Cannon ............... | H04L 41/0893 709/223 |
| 8,387,032 | B1* | 2/2013 | Goldman ................... | G06F 8/54 717/110 |
| 8,447,851 | B1* | 5/2013 | Anderson ........... | G06F 11/3006 707/600 |
| 8,732,312 | B2* | 5/2014 | Minato ................. | G06F 9/5083 709/223 |
| 8,892,499 | B2* | 11/2014 | Phelan .................... | G06Q 10/10 706/59 |
| 8,918,501 | B2 | 12/2014 | Feinberg et al. | |
| 9,003,037 | B2* | 4/2015 | Beveridge ............. | G06F 9/5011 709/223 |
| 9,003,416 | B2* | 4/2015 | Gangemi ............... | G06F 9/5011 718/100 |
| 9,049,193 | B2* | 6/2015 | Mai ......................... | H04L 67/10 |
| 9,052,954 | B2* | 6/2015 | Gangemi .............. | G06F 9/5011 |
| 9,210,040 | B2* | 12/2015 | Mikkilineni ........ | H04L 41/0886 |
| 9,213,574 | B2* | 12/2015 | Faruquie ................... | G06F 9/50 |
| 9,317,829 | B2* | 4/2016 | Anand ............... | G06Q 10/0635 |
| 9,336,119 | B2* | 5/2016 | Anderson ........... | G06F 11/3476 |
| 9,344,616 | B2* | 5/2016 | Donovan .......... | G08B 13/19645 |
| 9,348,944 | B2* | 5/2016 | Gerhart .................. | G06Q 10/06 |
| 9,356,846 | B2* | 5/2016 | Cremonesi ............. | G06Q 10/06 |
| 9,361,463 | B2* | 6/2016 | Ferragut ............... | G06F 21/577 |
| 9,529,863 | B1* | 12/2016 | Gindin ................. | G06F 16/254 |
| 9,558,367 | B2* | 1/2017 | Holz ................... | G06F 21/6245 |
| 2007/0266138 | A1* | 11/2007 | Spire .................. | G06F 11/0709 709/223 |
| 2008/0086345 | A1* | 4/2008 | Wilson ................. | G06F 16/958 705/7.11 |
| 2008/0109396 | A1* | 5/2008 | Kacin ............... | G06F 17/30867 |
| 2008/0215560 | A1* | 9/2008 | Bell ................. | G06F 17/30554 |
| 2010/0174753 | A1* | 7/2010 | Goranson ......... | G06F 17/30817 707/791 |
| 2013/0027561 | A1* | 1/2013 | Lee ....................... | G06Q 30/02 348/150 |
| 2013/0167136 | A1* | 6/2013 | Goldman .................. | G06F 8/61 717/175 |
| 2014/0002277 | A1* | 1/2014 | Fulger ................ | G01C 21/3415 340/905 |
| 2014/0365301 | A1* | 12/2014 | Rappoport ......... | G06Q 30/0253 705/14.51 |
| 2015/0186893 | A1* | 7/2015 | Kimble ................ | G06Q 30/016 705/304 |
| 2016/0343017 | A1* | 11/2016 | Carlson ............. | G06Q 30/0244 |
| 2017/0017631 | A1* | 1/2017 | Tang .................... | G06F 17/2247 |

OTHER PUBLICATIONS

Cook et al., "Vast Challenge 2012: Visual Analytics for Big Data," IEEE Vast, p. 251-255, IEEE Computer Science Society, Oct. 2012.
Gu et al., "Bot Miner; Clustering Analysis of Network Traffic for Protocol- and Structure-Independent Botnet Detection," Proceedings of the 17th conference on Security symposium, pp. 139-154, 2008.
Huang et al., "In-Network PCA and Anomaly Detection," Advances in Neural Information Processing Systems, pp. 617-624, 2006.
Lu, et al., A Large-Scale Network Data Analysis via Sparse and Low Rank Reconstruction, Discrete Dynamics in Nature and Society, vol. 2014 (2014), Article ID 323764, 10 pages.
Portnoy et al., "Intrusion Detection with Unlabeled Data Using Clustering," Proceedings of ACM CSS Workshop on Data Mining Applied to Security, 2001, 14 pages.
Valdes et al., "Probabilistic Alert Correlation", SRI International (http://www.csl.sri.com/papers/raid2001-pac/prob_corr.pdf).
Hellerstein et al., "An Approach to Predictive Detection for Service Management," Integrated Network Management VI, edited by M. Sloman et al., IEEE Publishing, pp. 309-322, May 1999.
Nagayama, et al., "Model-based Data Aggregation for Structural Monitoring Employing Smart Sensors," 3rd International Conference on Networked Sensing Systems (INSS), 2006, US.
Edson et al., "Problem Determination Using Self-Managing Autonomic Technology", IBM Corporation, Redbooks, http://www.redbooks.ibm.com/redbooks/pdfs/sg246665.pdf, Jun. 2005, pp. 3-21.
McDermott, "A Temporal Logic for Reasoning About Processes and Plan," Cognitive Science, 6, pp. 101-155, 1982, U.S.
Jonas, IBM Distinguished Engineer, "Enterprise Amnesia vs. Enterprise Intelligence," presented at DEFRAG 2010, Nov. 18, 2010, U.S.
Jonas, IBM Distinguished Engineer, "Big Data. Deep Analytics. New Physics. The Journey from Enterprise Amnesia to Enterprise Intelligence," presented at IBM PartnerWorld Conference, 2012, U.S.
Zhang et al., "Application Resource Demand Phase Analysis and Prediction in Support of Dynamic Resource Provisioning", IEEE Fourth International Conference on Autonomic Computing (ICAC'07), 2007, 2 pages.
Hampapur et al., "S3-R1: The IBM Smart Surveillance System—Release 1," IBM T. J. Watson Research Center, Proceedings of the ACM SIGMM 2004 Workshop on Effective Telepresences, ETP 2004, Oct. 15, 2004, New York, NY.
Hampapur et al., "S3: The IBM Smart Surveillance System: From Transactional Systems to Observational Systems," IBM T. J. Watson Research Center, Proceedings of the IEEE International Conference on Acoustics, Speech and Signal Processing, ICASSP 2007, Apr. 15-20, 2007, pp. IV-1385-IV-1388.
Shu et al., "IBM smart surveillance system (S3): A open and extensible framework for event based surveillance," IBM T. J. Watson Research Center, Proceedings of the IEEE Conference on Advanced Video and Signal Based Surveillance, AVSS 2005, Sep. 15-16, 2005, pp. 318-323.
Buzen et al., "MASF—Multivariate Adaptive Statistical Filtering," Proceedings of the Computer Measurement Group, pp. 1-10, 1995.
Ho et al., "Adaptive Network/Service Fault Detection in Transaction-Oriented Wide Area Networks," Integrated Network Management VI, edited by M. Sloman et al., IEEE Publishing, pp. 761-775, May 1999.
Adrian et al., "Analytic Platforms: Beyond the Traditional Data Warehouse," Beye Network Global Coverage of the Business Intelligence Ecosystem, TechTarget, BI Research, IT Market Strategy, 2010.
Ricknas, "Amazon adds CloudWatch to management tool," at http://www.infoworld.com/d/cloud-computing/amazon-adds-cloudwatch-managem- ent-tool-502.pdf, Jan. 26, 2011, pp. 1.

(56) References Cited

OTHER PUBLICATIONS

"Zyrion's Traverse Brings Proven BSM Advantages to Challenging Distributed Datacenter Environments," Dec. 15, 2009, pp. 1-4.

Thottan et al., "Fault Prediction at the Network Layer Using Intelligent Agents," Integrated Network Management VI, edited by M. Sloman et al., IEEE Publishing, pp. 745-759, May 1999.

De Gelas, "Infrastructure as a Service: Benchmarking Cloud Computing," available via the Internet at http://www.anandtech.com/show/4349/infrastructure-as-a-service-benchmarki- ng-cloud-computing, Jun. 2, 2011, pp. 1-6.

Ramm, "The Watcher Knows," http://www.linux-mag.com/id/1890, Mar. 15, 2005, pp. 1-5.

Schoenwaelder, "Simple Network Management Protocol (SNMP) Context EngineID Discovery," available via the Internet at http://tools.ietf.org/html/rfc5343, Network Working Group, Sep. 2008, pp. 1-10.

Case, et al., "A Simple Network Management Protocol (SNMP)," http://tools.ietf.org/html/rfc1157, Network Working Group, May 1990, pp. 1-37.

Mukhar, "Zyrion Expands to Cloud Infrastructure Monitoring," http://www.mspmentor.net/2011/02/08/zyrion-expands-to-cloud-infrastructur- e-monitoring, Feb. 8, 2011, pp. 1.

Boukezzoula et al., Fuzzy Feedback Linearizing Controller and its Equivalence With the Fuzzy Nonlinear Internal Model Control Structure, 2007, pp, 233-248, <http://matwbn.icm.edu.pl/ksiazki/amc/amc17/amc1729.pdf>.

Burgstahler et al, "Beyond Technology: The Missing Pieces of QoS Success"; Proceedings of the ACM Sigcomm 2003 Workshops; Aug. 25 & 27, 2003.

Kok et al., "PowerMatcher: Multiagent Control in the Electricity Infrastructure"; AAMAS'05 Jul. 25-29, 2005.

Jonas et al., "Using Entity Analytics to Greatly Increase the Accuracy of Your Models Quickly and Easily," IBM Redbooks, published on Sep. 13, 2012, 12 pages.

Official Communication for U.S. Appl. No. 15/254,996 dated Dec. 5, 2016, 9 pages.

Official Communication for U.S. Appl. No. 15/443,961 dated Aug. 14, 2017, 8 pages.

Official Communication for U.S. Appl. No. 15/443,961 dated Apr. 28, 2017, 6 pages.

\* cited by examiner

OPERATIONS COMMAND CONSOLE

CROSS-REFERENCE TO RELATED APPLICATIONS

This application is a Utility patent application based on a previously filed U.S. Provisional Patent Application U.S. Ser. No. 62/393,542 filed on Sep. 12, 2016, entitled "OPERATIONS COMMAND CONSOLE," the benefit of the filing date of which is hereby claimed under 35 U.S.C. § 119(e) and which is further incorporated by reference in its entirety.

TECHNICAL FIELD

The present invention relates generally to computer operations management and more particularly, but not exclusively to providing real-time management of information technology operations and personnel at scale in noisy, complex, distributed, heterogeneous, and dynamically changing environments.

BACKGROUND

With the increase in complexity of distributed computing systems due to the growing demand and reliance on the Internet for business, the response to Operations Incidents is highly complex at all scales. An army of experts is often needed to deal with the complexity, pace of change, distributed nature of teams, speed of delivery, and the impact Incidents may have on the businesses. This may result in organizational complexity that may create the need for improved management to improve operational efficiency.

In some cases, the organizational complexity may make it difficult for various involved actors (e.g., responders) to rapidly make accurate assessments or effectively react to unfolding operations incidents. Likewise, responders having different roles or different responsibilities may require different user-interfaces or visualizations that enable them to efficiently orchestrate responses to the operations incidents. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
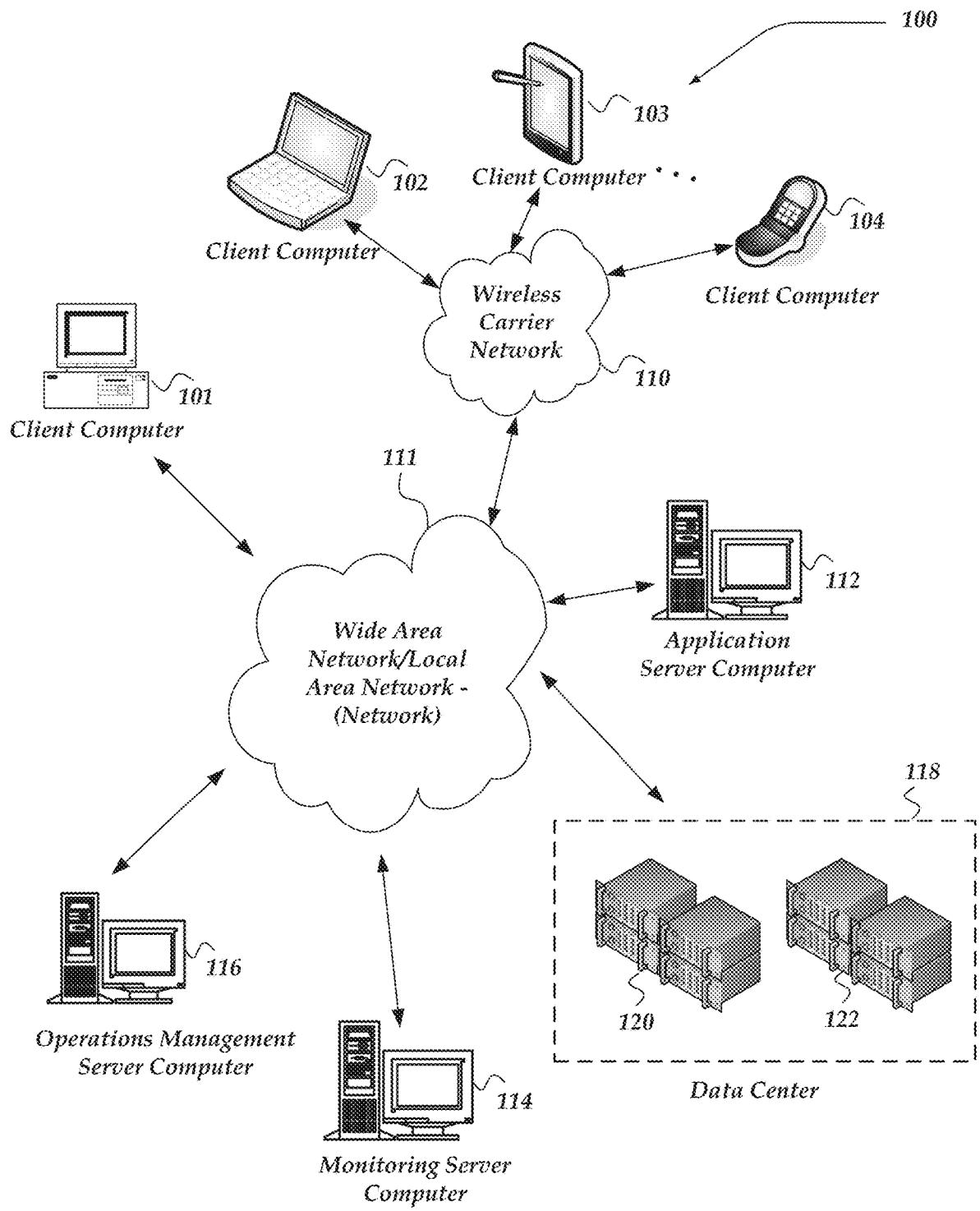
FIG. 1 shows components of one embodiment of an environment in which embodiments of the invention may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

The term "organization" as used herein refers to a business, a company, an association, an enterprise, a confederation, or the like.

The term "operations management system" as used herein is computer system that may be arranged to monitor, manage, and compare, the operations of one or more organizations. Operations management system may be arranged to accept various Operations events that indicate events and/or incidents occurring in the managed organizations. Operations management systems may be arranged to manage several separate organizations at the same time. These separate organizations may be considered a community of organizations.

The terms "event," "Operations event" as used herein refer one or more outcomes, conditions, or occurrences that may be detected or observed by an operations management system. Operations management systems may be configured to monitor various types of events depending on needs of an industry and/or technology area. For example, information technology services may generate events in response to one or more conditions, such as, computers going offline, memory overutilization, CPU overutilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof.

Events and/or Operations events may be provided to the operations management system using one or more messages, emails, telephone calls, library function calls, application programming interface (API) calls, including, any signals provided to an operations management system indicating that an event has occurred. One or more third party and/or external systems may be configured to generate event messages that are provided to the operations management system.

The term "resource" as used herein refers to a person or entity that may be responsible for responding to an event associated with a monitored application or service. For example, resources may be members of an information technology (IT) team providing support to employees of a company. Resources may be notified if an event they are responsible for handling at that time is encountered. In some embodiments, a scheduler application may be arranged to associate one or more resources with times that they are responsible for handling particular events (e.g., times when they are on-call to maintain various IT services for a company). A resource that is determined to be responsible for handling a particular event may be referred to as a responsible resource. Responsible resources may be considered to be on-call and/or active during the period of time they are designated by the schedule to be available.

The term "incidents" as used herein may refer to a condition or state in the managed networking environments that requires some form of resolution by a user or automated service. Typically, incidents may be a failure or error that occurs in the operation of a managed network and/or computing environment. One or more events may be associated with one or more incidents. However, not all events are associated with incidents.

The terms "incident response" as used herein refer to the actions, resources, services, messages, notifications, alerts, events, or the like, related to resolving one or more incidents. Accordingly, services that may be impacted by a pending incident, may be added to the incident response associated with the incident. Likewise, resources responsible for supporting or maintaining the services may also be added to the incident response. Further, log entries, journal entries, notes, timelines, task lists, status information, or the like, may be part of an incident response.

The term "incident commander" as used herein refers to a user or resource that is responsible for administering an incident response.

The term "notification message" as used herein refers to a communication provided by an incident management system to a message provider for delivery to one or more responsible resources. A notification message may be used to inform one or more responsible resources that one or more event messages were received. For example, in at least one of the various embodiments, notification messages may be provided to the one or more responsible resources using SMS texts, MMS texts, email, Instant Messages, mobile device push notifications, HTTP requests, voice calls (telephone calls, Voice Over IP calls (VOIP), or the like), library function calls, API calls, URLs, audio alerts, haptic alerts, other signals, or the like, or combination thereof.

The term "message provider" as used herein refers to a first or third party service provider that communicates one or more notification messages to one or more responsible resources. Message providers may communicate with one or more types of technologies, such as, SMS texts, MMS texts, email, Instant Messages (IM), push notifications, HTTP requests, voice calls, library function calls, audio alerts, haptic alerts, any signals, or the like, or combination thereof. A notification system may employ one or more message providers to at least communicate notification messages to the one or more responsible resources.

The term "responder" as used herein refers to a resource that is an individual person.

The term "team" as used herein refers to one or more resources that may be jointly responsible for maintaining or supporting one or more services or system for an organization.

The term "service" as used herein refers to an organizational unit in an organization that provides one or more functional or operational systems that supply or provide various needs of an organization or an organization's customers.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards to managing operations for an organization. In one or more of the various embodiments, an operation engine may be employed to perform actions, including: providing one or more operations metrics based on one or more events and one or more resolution actions such that the one or more operations metrics may be associated with an incident; transforming the one or more operations metrics into update information such that the update information may include one or more data objects; providing the update information to one or more console modules included in one or more operations command consoles (OCCs) such that each of the one or more console modules may include one or more module views, or the like.

In one or more of the various embodiments, the one or more operations metrics associated with the incident may include, one or more of, a time-to-resolve value, a number of responders required to resolve, one or more names of responders or teams required to resolve, or a priority of the incident in terms of operations and business impact.

In one or more of the various embodiments, the operations engine may be employed to associate a user with the role based on a mapping of users to roles. And, in one or more of the various embodiments, selecting the one or more console modules based on the role that may be associated with the user.

In one or more of the various embodiments, the one or more console modules may be employed to provide the one or more data objects to one or more module views such that the one or more module views are associated with the one or more console modules.

In one or more of the various embodiments, the one or more console modules may be employed to accumulate update information that may be provided by the operations engine such that one or more values associated with the accumulated update information exceeds a defined threshold. And, in one or more of the various embodiments, providing the one or more data objects included in the accumulated update information to the one or more module views.

In one or more of the various embodiments, the one or more module views may be employed to provide one or more different visualizations of the incident based on a role that may be associated with the one or more console modules.

In one or more of the various embodiments, one of the one or more OCCs may be employed to provide one or more other resolution actions to the operations engine such that the operations engine may provide additional update information to the one or more console modules based on the one or more other resolution actions.

In one or more of the various embodiments, employing the one of the one or more OCCs to provide the one or more other resolution actions to the operations engine may include: employing the one or more module views to display one or more user-interfaces based on the one or more data objects; employing the one or more module views to capture the one or more user-interface events based on one or more actions of a user; and employing the one or more module view to provide the one or more other resolution actions based on the one or more user-interface events and the one or more data objects.

In one or more of the various embodiments, the one or more OCCs may be employed to authenticate one or more users. And, in one or more of the various embodiments, the operations engine may be employed to: identify one or more roles that may correspond to the one or more users; select the one or more console modules based on the one or more roles and the one or more users; and to deploy the one or more console modules on the one or more OCCs.

In one or more of the various embodiments, the operations engine may be employed to compile the one or more console modules from one or more of source code, software libraries, objects, databases, executables, configuration data, or the like. In one or more of the various embodiments, the operations engine may be employed to bundle the one or more console modules and the one or more OCCs into one or more virtual machines. And, in one or more of the various embodiments, the operations engine may be employed to deploying the one or more virtual machines on one or more client computers or one or more network computers.

Illustrated Operating Environment

FIG. 1 shows components of one embodiment of an environment in which the invention may be practiced. Not all the components may be required to practice various embodiments, and variations in the arrangement and type of the components may be made. As shown, system 100 of FIG. 1 includes local area networks ("LANs")/wide area networks ("WANs")—(network) 111, wireless network 110, client computers 101-104, application server 112, monitoring server 114, and operations management server computer 116.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. Likewise, client computers 102-104 may include Internet-of-Things (JOT) devices as well. Accordingly, client computers 102-104 typically range widely in terms of capabilities and features. For example, a cell phone may have a numeric keypad and a few lines of monochrome Liquid Crystal Display (LCD) on which only text may be displayed. In another example, a mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of client computers 102-104 may operate over wired and/or wireless network. Today, many of these devices include a capability to access and/or otherwise communicate over a network such as network 111 and/or even wireless network 110. Moreover, client computers 102-104 may access various computing applications, including a browser, or other web-based application.

In one embodiment, one or more of client computers 101-104 may be configured to operate within a business or other entity to perform a variety of services for the business or other entity. For example, client computers 101-104 may be configured to operate as a web server, an accounting server, a production server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client computer may employ the browser application to perform various actions over a network.

Client computers 101-104 also may include at least one other client application that is configured to receive and/or send data, operations information, between another computing device. The client application may include a capability to provide requests and/or receive data relating to managing, operating, or configuring the operations management server computer 116.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between client computers 102-104 and another computing device, network, or the like.

Network 111 is configured to couple network devices with other computing devices, including, schedule manager server 116, monitoring server 114, application server 112, client computer(s) 101, and through wireless network 110 to client computers 102-104. Network 111 is enabled to employ any form of computer readable media for communicating information from one electronic device to another. Also, network 111 can include the internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 3:
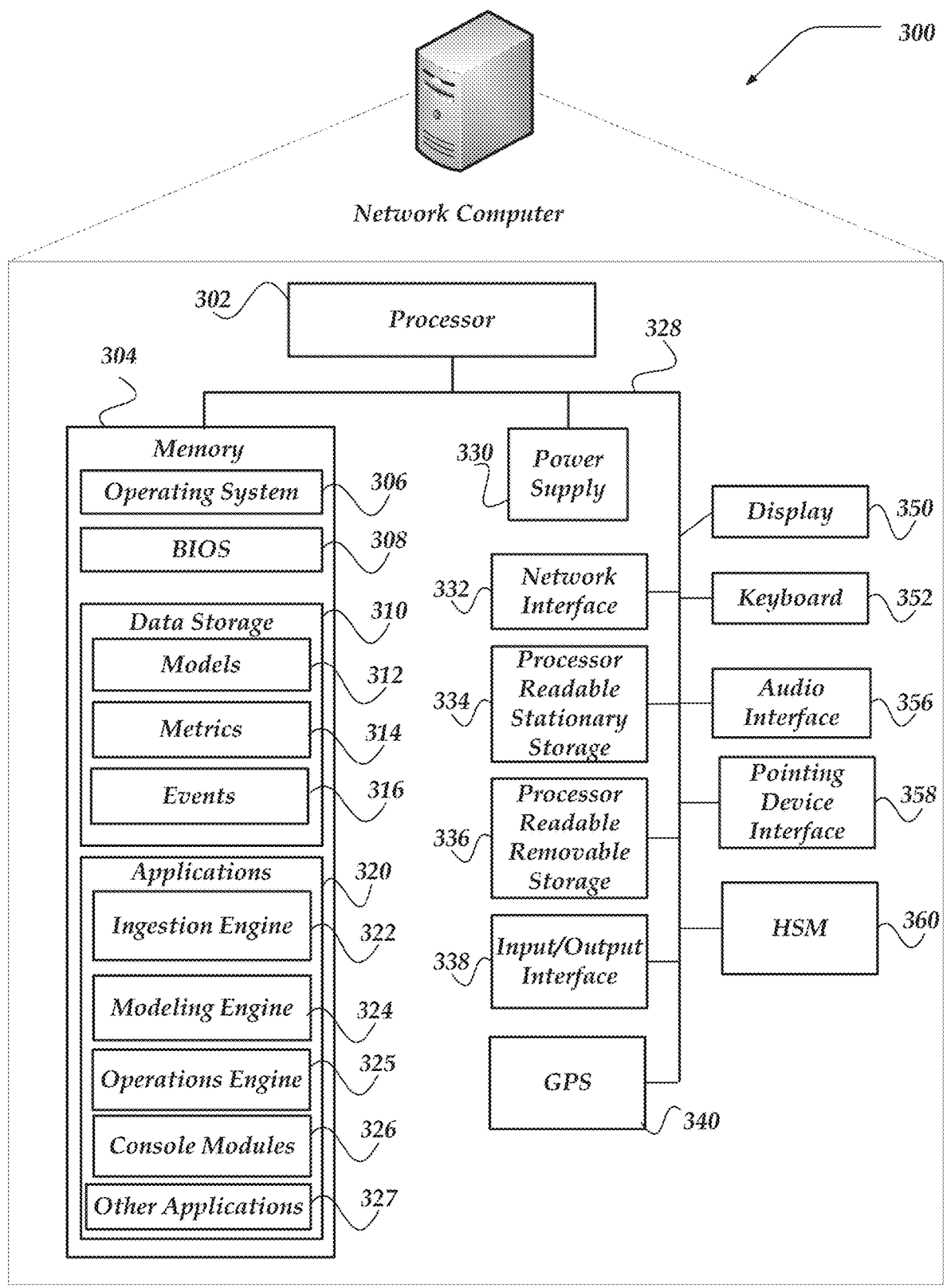
FIG. 3 shows one embodiment of a network computer, in accordance with one or more of the various embodiments.

Operations management server computer 116 may include virtually any network computer usable to provide computer operations management services, such as network computer 300 of FIG. 3. In one embodiment, operations management server computer 116 employs various techniques for managing the operations of computer operations, networking performance, customer service, customer support, resource schedules and notification policies, event management, operations health management, or the like. Also, operations management server computer 116 may be arranged to interface/integrate with one or more external systems such as telephony carriers, email systems, web services, or the like, to perform computer operations management. Further, operations management server computer 116 may obtain various events and/or performance metrics collected by other systems, such as, monitoring server computer 114.

In at least one of the various embodiments, monitoring server computer 114 represents various computers that may be arranged to monitor the performance of computer operations for an entity (e.g., company or enterprise). For example, monitoring server computer 114 may be arranged to monitor whether applications/systems are operational, network performance, trouble tickets and/or their resolution, or the like. In some embodiments, the functions of monitoring server computer 114 may be performed by operations management server computer 116.

Devices that may operate as operations management server computer 116 include various network computers, including, but not limited to personal computers, desktop computers, multiprocessor systems, microprocessor-based or programmable consumer electronics, network PCs, server devices, network appliances, or the like. It should be noted that while operations management server computer 116 is illustrated as a single network computer, the invention is not so limited. Thus, operations management server computer 116 may represent a plurality of network computers. For example, in one embodiment, operations management server computer 116 may be distributed over a plurality of network computers and/or implemented using cloud architecture.

Moreover, operations management server computer 116 is not limited to a particular configuration. Thus, operations management server computer 116 may operate using a master/slave approach over a plurality of network computers, within a cluster, a peer-to-peer architecture, and/or any of a variety of other architectures.

In some embodiments, one or more data centers, such as, data center 118 may be communicatively coupled to network 111 and/or network 108. In at least one of the various embodiments, data center 118 may be a portion of a private data center, public data center, public cloud environment, or private cloud environment. In some embodiments, data center 118 may be a server room/data center that is physically under the control of an organization. Data center 118 may include one or more enclosures of network computers, such as, enclosure 120 and enclosure 122.

Enclosure 120 and enclosure 122 may be enclosures (e.g., racks, cabinets, or the like) of network computers and/or blade servers in data center 118. In some embodiments, enclosure 120 and enclosure 122 may be arranged to include one or more network computers arranged to operate as operations management server computers, monitoring server computers (e.g., operations management service computer 116, monitoring server computer 114, or the like), storage computers, or the like, or combination thereof. Further, one or more cloud instances may be operative on one or more network computers included in enclosure 120 and enclosure 122.

Also, data center 118 may include one or more public or private cloud networks. Accordingly, data center 118 may comprise multiple physical network computers, interconnected by one or more networks, such as, networks similar to and/or including network 108 and/or wireless network 110. Data center 118 may enable and/or provide one or more cloud instances (not shown). The number and composition of cloud instances may be vary depending on the demands of individual users, cloud network arrangement, operational loads, performance considerations, application needs, operational policy, or the like. In at least one of the various embodiments, data center 118 may be arranged as a hybrid network that includes a combination of hardware resources, private cloud resources, public cloud resources, or the like.

Thus, operations management server computer 116 is not to be construed as being limited to a single environment, and other configurations, and architectures are also contemplated. Operations management server computer 116 may employ processes such as described below in conjunction with at some of the figures discussed below to perform at least some of its actions.

Illustrative Client Computer

Figure 2:
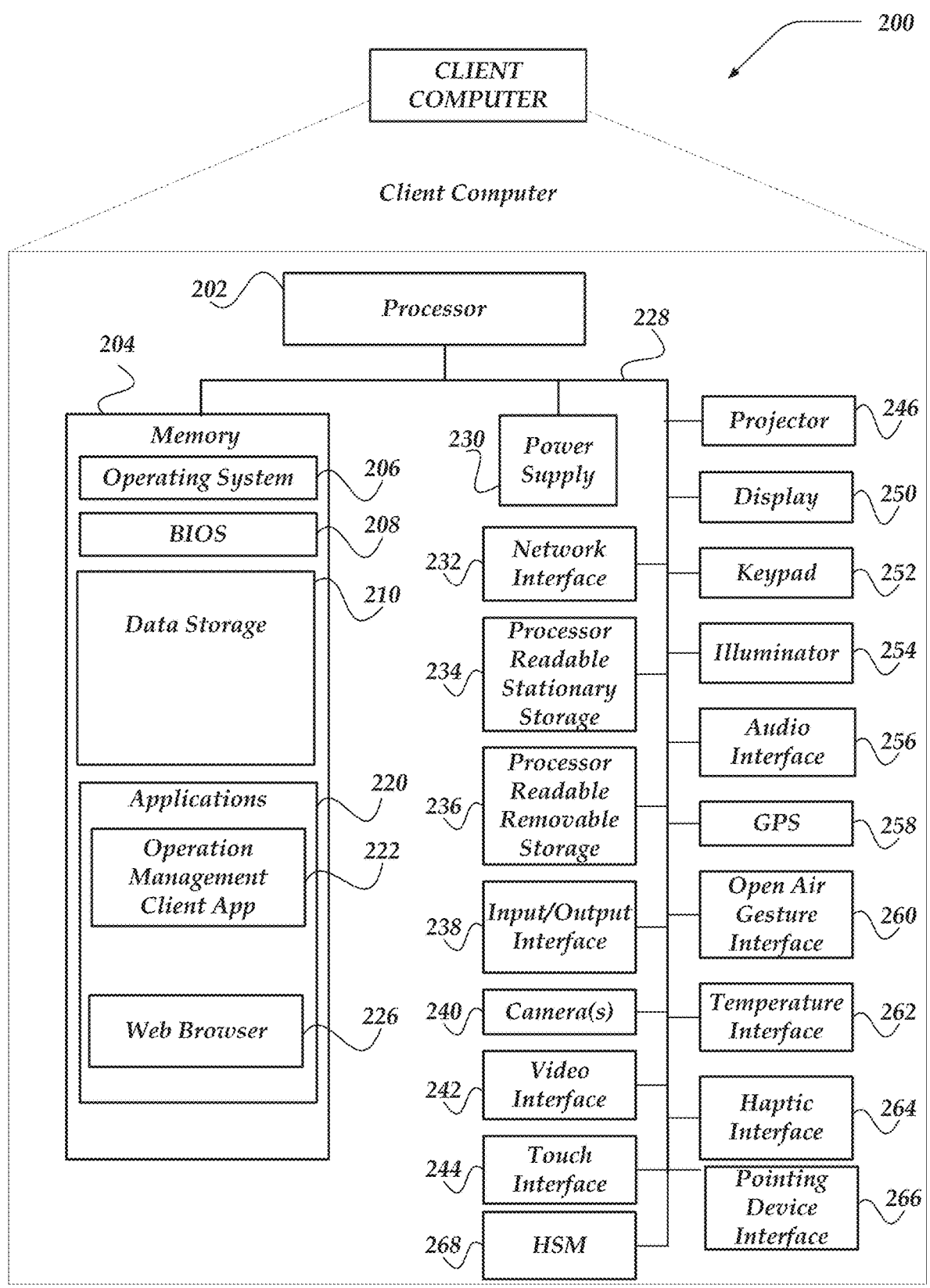
FIG. 2 shows one embodiment of a client computer that may be included in a system in accordance with one or more of the various embodiments.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Bluetooth LE, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX', or a specialized client computer communication operating system such as Windows Phone™, or IOS® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, operations management client application 222. In at least one of the various embodiments, operations management client application 222 may be used to exchange communications to and from operations management server computer 116, monitoring server computer 114, application server computer 112, or the like. Exchanged communications may include, but are not limited to, queries, searches, messages, notification messages, event messages, alerts, performance metrics, responder operations health score information, team operations health score information, services operations health score information, log data, API calls, or the like, combination thereof.

In one or more of the various embodiments, operation management client application 222 may be arranged to display or host an operations command console in accordance with one or more of the various embodiments described herein.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of operations management server computer 116, monitoring server computer(s) 114, or application server computer(s) 112 of FIG. 1. Further, in some embodiments, network computer 300 may represent one or more network computers included in a data center, such as, data center 118, enclosure 120, enclosure 122, or the like.

As shown in the figure, network computer 300 includes a processor 302 in communication with a memory 304 via a bus 328. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In at least one embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 410 may also be employed to store social networking information including address books, buddy lists, aliases, user profile information, or the like. Data storage 310 may further include program code, instructions, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, incident models, performance models, or operation models 312, operations metrics 314, Operations events 316, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include ingestion engine 322, modeling engine 324, operations engine 325, console modules 326, other applications 327 that perform actions further described below. In at least one of the various embodiments, one or more of the applications may be implemented as modules and/or components of another application. Further, in at least one of the various embodiments, applications may be implemented as operating system extensions, modules, plugins, or the like.

Furthermore, in at least one of the various embodiments, ingestion engine 322, modeling engine 324, operations engine 325, console modules 326, other applications 327, or the like, may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to ingestion engine 322, modeling engine 324, operations engine 325, console modules 326, other applications 327, may be provisioned and de-commissioned automatically.

In at least one of the various embodiments, applications, such as, ingestion engine 322, modeling engine 324, operations engine 325, console modules 326, other applications 327, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 340. Also, in some embodiments, geolocation information may include information providing using one or more geolocation protocol over the networks, such as, wireless network 108 and/or network 111.

Also, in at least one of the various embodiments, ingestion engine 322, modeling engine 324, operations engine 325, console modules 326, other applications 327, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4:
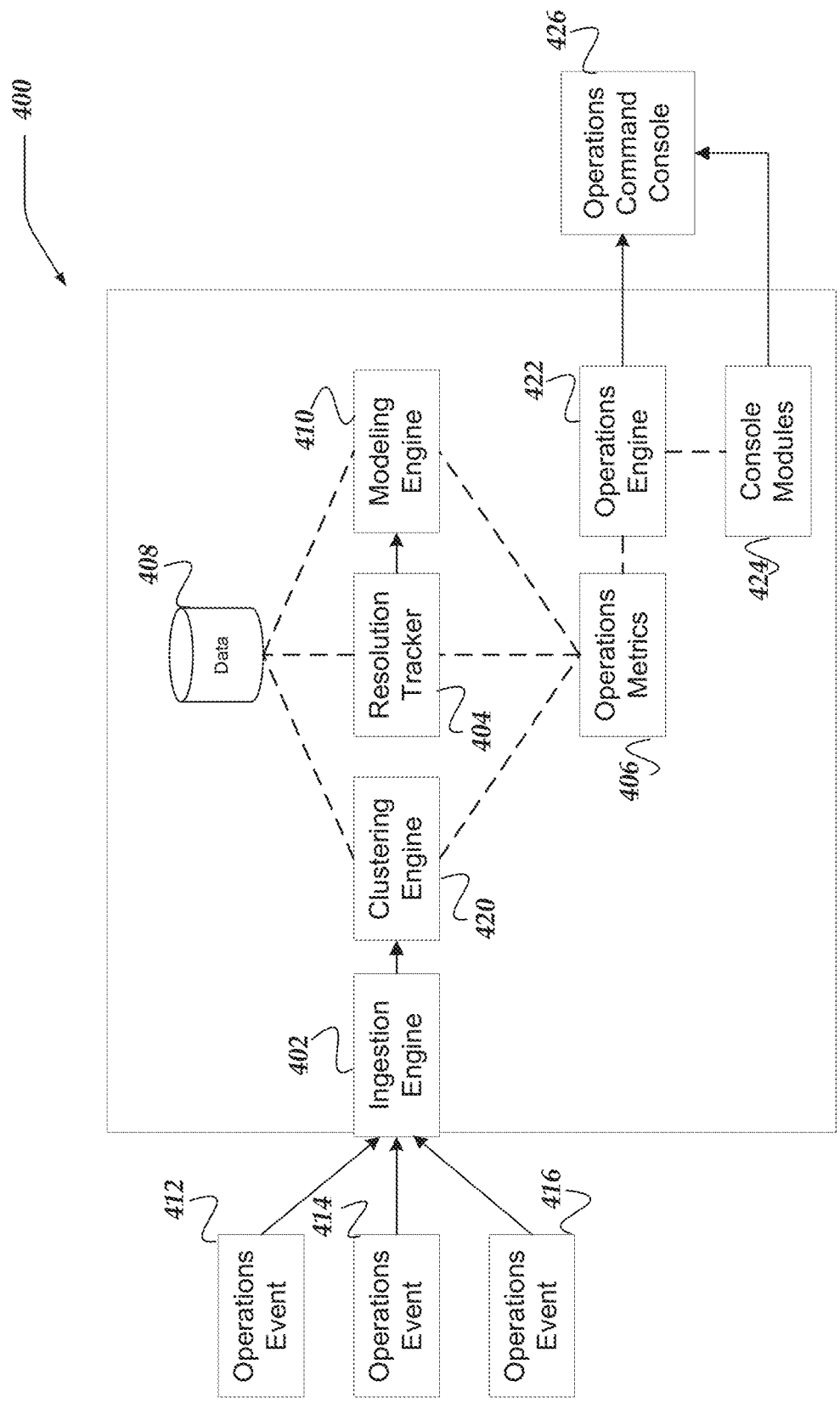
FIG. 4 illustrates a logical architecture of a system that provides operations command console for operations management in accordance with one or more of the various embodiments.

FIG. 4 illustrates a logical architecture of system 400 that provides operations command console for operations management in accordance with one or more of the various embodiments. In at least one of the various embodiments, a system for providing operations command consoles for entities or enterprises may comprise various components. In this example, system 400 includes, ingestion engine 402, resolution tracker 404, operations metrics 406, database 408, modeling engine 410, clustering engine 420, operations engine 422, console modules 424, operations command console 426, or the like.

In at least one of the various embodiments, an ingestion engine such as ingestion engine 402 may be arranged to receive and/or obtain one or more different types of Operations events provided by various sources, here represented by Operations event 412, Operations event 414, and Operations event 416. In at least one of the various embodiments, Operations events may be variously formatted messages that reflect the occurrence of events and/or incidents that have occurred in an organization's computing system. Such events may include alerts regarding system errors, warning, failure reports, customer service requests, status messages, or the like. Operations events may be collected by one or more external services and provided to system 400. Operations events, as described above may be comprised of SMS messages, HTTP requests/posts, API calls, log file entries, trouble tickets, emails, or the like. In at least one of the various embodiments, Operations events may include associated information, such as, source, time stamps, status indicators, or the like, that may be tracked. Also, in some embodiments, Operations events, may also be associated with one or more service teams the may be responsible for resolving the issues related to the Operations events.

Accordingly, ingestion engine 402 may be arranged to receive the various Operations events and perform various actions, including, filtering, reformatting, information extraction, data normalizing, or the like, or combination thereof, to enable the Operations events to be stored and processed. In at least one of the various embodiments, Operations events may be stored in database 408.

In at least one of the various embodiments, Operations events may be provided by one or more organizations. In some embodiments, there may be several organization (e.g., 100's, 1000's, or the like) that provide Operations events to the system. Operations events from different organizations may be segregated from each other so that an organization may only interact with events that are owned by it. However, system 400 may be arranged to have visibility to all of the Operations events enabling community wide analysis to be performed.

In at least one of the various embodiments, ingestion engine 402 may be arranged to normalize incoming events into a unified common event format. Accordingly, in some embodiments, ingestion engine 402 may be arranged to employ configuration information, including, rules, templates, maps, dictionaries, or the like, or combination thereof, to normalize the fields and values of incoming events to the common event format.

In at least one of the various embodiments, clustering engine 420, may be arranged to execute one or more clustering processes to provide one or more event clusters based on the normalized Operations events. In some embodiments, clustering engine 420 may be arranged to group Operations events into event clusters based on one or more characteristics of the Operations events.

In at least one of the various embodiments, resolution tracker 404 may be arranged to monitor the details regarding how the Operations events are resolved. In some embodiments, this may include tracking the incident life-cycle metrics related to the Operations events (e.g., creation time, acknowledgement time(s), or resolution time), the resources that are/were responsible for resolving the events, and so on. Likewise, operation metrics 406 may be arranged to record the metrics related to the resolution of the Operations events. For example, operation metrics 406 may be arranged to compute various metrics, such as, mean-time-to-acknowledge (MTTA), mean-time-to-resolve (MTTR), incident count per resolvers, resolution escalations, uniqueness of events, auto-resolve rate, time-of-day of incidents, adjusting for multiple events per single incident, service dependencies, infrastructure topology, or the like, or combination thereof. Also, in at least one of the various embodiments, computed metrics may include time-to-discovery, time-to-acknowledgement, time-to-resolution, or transformations of these metrics, such as, mean, median, percentile, or the like. Further, one of ordinary skill in the art will appreciate that there are other relevant metrics that may be generated, measured, or collected. It is in the interest of clarity and brevity that the descriptions of additional metrics are omitted.

In at least one of the various embodiments, system 400 may include various user-interfaces and/or configuration information that enable organizations to establish how Operations events should be resolved. (Not shown in FIG. 4) Accordingly, an organization may define, rules, conditions, priority levels, notification rules, escalation rules, or the like, or combination thereof, that may be associated with different types of Operations events. For example, some Operations events may be informational rather than associated with a critical failure. Accordingly, an organization may establish different rules and/or other handling mechanics for the different types of events. For example, in some embodiments, critical events may require immediate notification of a response user to resolve the underlying cause of the event. In other cases, the Operations events may simply be recorded for future analysis.

In at least one of the various embodiments, Modeling engine 410 may be arranged to use the various metrics associated with Operations events, incidents, resolution of events, and so on, to produce one or more models that reflect the behavior of the operational system and organization. In at least one of the various embodiments, modeling engine 410 may be used to generate one or more operational models from one or more organizations that may be managed by system 400. Models for individual organizations may be provided as well as models for the community of organizations and/or sub-sections of the community.

Furthermore, in at least one of the various embodiments, since client computer 200 or network computer 300 is arranged to include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like.

For example, in at least one embodiment, geolocation information (such as latitude and longitude coordinates, or the like) is collected by a hardware GPS sensor and subsequently employed in the computing of performance metrics, operations models, or the like. Similarly, in at least one embodiment, weather information (such as temperature, atmospheric pressure, wind speed, humidity, or the like) is collected by a hardware weather sensor and subsequently employed in the computing of performance metrics, operations models, or the like. Additionally, in at least one embodiment, electrical power information (such as voltage, current, frequency, or the like) is collected by a hardware electrical power sensor and subsequently employed in the computing of performance metrics, operations models, or the like. Also Operations events may be modified to include geolocation and/or sensor information. Accordingly, performance metrics and operations models may be categorized or compared across different conditions or locations. For example, hot and cold weather extremes may impact the values of one or more metrics and/or models. Likewise, in at least one of the various embodiments, system 400 may be arranged to determine one or more localization features based on the geolocation information collected from its GPS systems, sensors, network, network interface, or the like, or combination thereof.

Also, in at least one of the various embodiments, sensing geolocation information provided by one or more geolocation devices is employed to perform one or more actions, such as: providing a modification of the one or more metrics and/or models based at least on the sensed information; or localizing the one or more recommendations based at least on the sensed information.

In one or more of the various embodiments, resolution tracker 404 or operations engine 422 may be arranged to provide operations metrics 406 based on tracking the handling or resolution of Operations events. In one or more of the various embodiments, operations metrics may include various statistics or values related to measuring or evaluating the status or performance of incident response.

In one or more of the various embodiments, operations engine 422 may be arranged to correlate or provide various operations metrics 406 with one or more console modules 424. In one or more of the various embodiments, operation engine 422 may provide selected operation metrics to one or more command console modules. In one or more of the various embodiments, one or more console modules may be configured to accept various types of operations metrics. Accordingly, in some embodiments, operation engine 422 may be arranged to select the appropriate operations metrics for providing to individual console modules.

In one or more of the various embodiments, console module 424 represents the various console modules employed by operations command consoles, such as operations command console 426. In one or more of the various embodiments, each console module may be arranged to provide a view of operation metrics, incident status, incident actions, operations events, or the like, tailored for a particular responder/resource role.

In one or more of the various embodiments, operations command console 426 may be arranged to provide interactive reports or user-interfaces for console modules. In some embodiments, the particular console modules provided for a given user (e.g., responders, resources, or the like) may depend on the role of the user that may be accessing operations command console 426.

In one or more of the various embodiments, operations command consoles may be arranged to host or serve applications to provide user-interfaces, interactive reports, console modules, module views, visualizations, or the like, or combination thereof, to client applications, such as, operations management client application 222, or the like.

In one or more of the various embodiments, operations engine 325 may be arranged to instantiate some or all of the data structures required by operations command consoles. Likewise, in one or more of the various embodiments, operation engine 325 may be arranged to perform one or more actions required for operations command consoles. In some embodiments, operation engines may be arranged to instantiate operations command consoles as one or more features of an operations management system hosted or executed by one or more operations management server computers.

Figure 5:
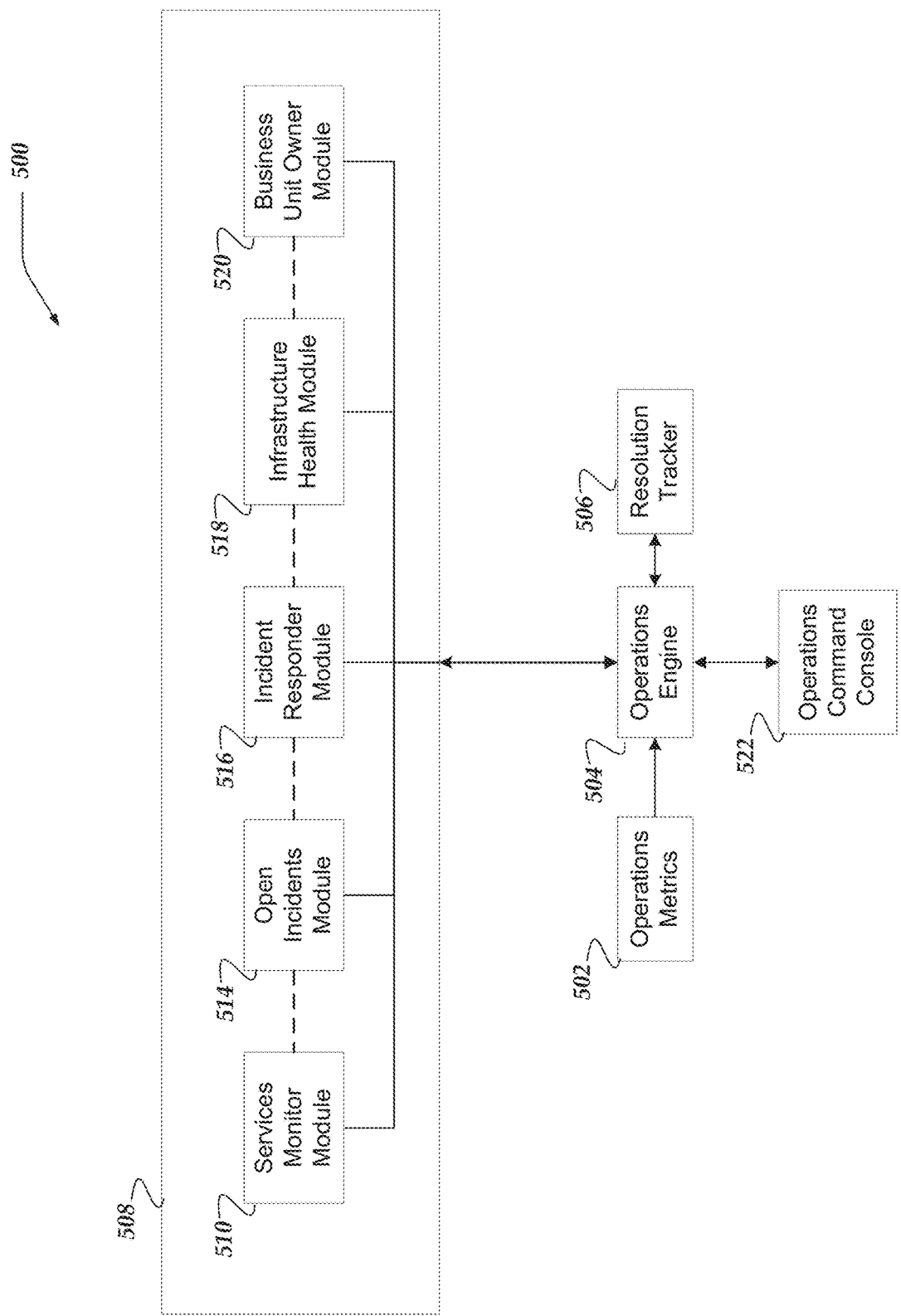
FIG. 5 illustrates a logical architecture of a system for providing operations command consoles in accordance with one or more of the various embodiments.

FIG. 5 illustrates a logical architecture of system 500 for providing operations command consoles in accordance with one or more of the various embodiments. In one or more of the various embodiments, system 500 may include, operation metrics 502, operations engine 504, resolution tracker 506, console modules 508, other the like, as described above. In one or more of the various embodiments, console modules 508 may include or be comprised various console modules, such as, service monitor module 510, open incidents module 514, incident response module 516, infrastructure health module 518, business unit owner module 520, or the like. In one or more of the various embodiments, one or more console modules may be arranged to project views of operations metrics optimized for one or more specified roles. Accordingly, in one or more of the various embodiments, console modules may be adapted for different roles. In one or more of the various embodiments, console modules may be arranged to include filters, transforms, visualizations, or the like, that enable different console modules to provide specialized views from a common set of operations metrics that may be provided using model object that conform to a common schema.

Likewise, in one or more of the various embodiments, console modules may be arranged to provide module views (e.g., user-interfaces, interactive reports, or the like) module controllers, module data models, operations command console connectors, or the like, that may be specialized for particular roles in the operations management for an organization.

Note, one of ordinary skill in the art will appreciate that operations management systems or operations command consoles may include more or fewer console modules than shown in FIG. 5.

In one or more of the various embodiments, operations engine 504 may be arranged to associate one or more of the console modules to the roles used in the system. Further, in some embodiments, operations engine 504 may be arranged to authenticate users and confirm their role or authorization rights.

Also, in one or more of the various embodiments, operations engine 504 may be arranged to provide console modules to operation command consoles, such as, operations command console 522. In one or more of the various embodiments, operations engines, such as, operations engine 504 may be arranged to be a gateway that controls or monitors the operations metrics that may be accessed by a given console module. In some embodiment, operations engine 504 may be arranged to transfer data, data structures, containers, source code, object code, schemes, configuration data, data definition files that comprise the operations metrics, console modules, or the like, to operations command console 522 for execution. In some embodiments, operations engine 504 may be arranged to provide directives or configuration information to operations command console 522 that may enable operations command console 522 to locate or activate module console that may be pre-installed or remotely located. For example, in some embodiments, if a user accesses operations command console 522, operations engine 504 may authenticate the user and determine their role. Next, in this example, operation engine 504 may locate or generate an executable container that includes the console module for that is appropriate for the user and communicate to operations command console 522. In another example, for other embodiments, operations engine 504 may be arranged provide configuration information that enables operations command console 522 to locate or instantiate console modules or load operations metrics directly.

In one or more of the various embodiments, transparent communication and streamlined interfaces between functions across the entire organization may be paramount in resolving IT Operations issues at scale. In some embodiments, operations command consoles enable organizations to manages the contextual ecosystem of data and human response information for both centralized and distributed IT Operations teams to ensure the right people and workflows can be orchestrated to accelerate incident response and remediation issues quickly.

In one or more of the various embodiments, various operational roles may be arranged to solve issues related to IT Operations. In some embodiments, incident commanders may be responsible for understanding customer impact, communicating customer impact to other resources, it, and driving resources to find a mitigation as quickly as possible/ Accordingly, incident commanders may be tasked with keeping everyone organized and focused on the tasks at hand.

In one or more of the various embodiments, first responders may be responsible for quickly identifying the source of a problem, suggesting solutions based on strong tribal knowledge, dispatching resources required to solve for specific situations, or accurately estimating task time to completion.

In one or more of the various embodiments, on-call engineers may be responsible for solving the up-to-the-minute problems provided via alerts, balancing lots of tasks simultaneously, handling one or more critical tasks. In some embodiments, this role may often be overwhelming, especially if multiple alerts or operations event come in at one time.

In one or more of the various embodiments, devops team managers may be responsible for managing a team of engineers and scrum teams; or managing the team's resources to ensure their schedules cover all of their paging duties and that they have the right permissions to get all their tasks covered in the alert and incident spaces. In some embodiments, this role also participates in some of the incident management events and helps teams if they have to work on a post-mortem report or post-mortem activity.

In one or more of the various embodiments, devops team leads may be a senior member of the devops team that may be responsible for managing who should be taking on the off-hour alerts that come through. In some embodiments, devops team leads may work on automating infrastructure configurations or in some cases they may be involved in the postmortem for all high severity alerts.

In one or more of the various embodiments, network operations center (NOC) operations manager may be the first line of response when events come into the NOC. They may be responsible for sorting, prioritizing, or suppressing events. In some cases, they may be responsible for routing events into a monitoring and alerting platform so downstream teams can resolve the alerts.

In one or more of the various embodiments, vice presidents of engineering may be responsible for ensuring that the management team is on-the-ball and has everything they need. Also, they may be responsible for managing multiple engineering teams, managing product and hiring strategy, and help to providing to funding for their organization.

In one or more of the various embodiments, business unit owners may be responsible for making the final call on strategies for where the product-line is going, or how to resource plan and allocate toward that end. In some embodiments, they may work in partnership with other business unit owner's business plans.

In one or more of the various embodiments, CEO/CFO/CTOs may be responsible for ensuring business units are aligned and on-track with the organization's business plan. In some embodiments, they may answer to stockholders on business efficiency and forecasts.

All of these individuals and their teams across the organization may have their own unique perspective, and lenses for successfully solving IT Operations issues successfully for their organization. In one or more of the various embodiments, the roles described above may be more effective when using an operations command console as a source-of-truth for IT operations, orchestration and incident triage, response, or analysis. In one or more of the various embodiments, an operations command console described here may enhance awareness for all involved of the situational context around IT Operations and how it may impact their organization. Accordingly, in one or more of the various embodiments, organizations as a whole may be enabled to manage their IT operations in a more holistic manner, thereby accelerating or prioritizing incident response or remediation.

In one or more of the various embodiments, each of the console modules may include one or more module views that include visualizations that may interconnect with other console modules, operation metrics, or the like, to provide pertinent and meaningful information about some or all operations events or incidents that may be occurring in an organization's IT systems. In one or more of the various embodiments, console modules running in an operations command console are not just static views or reports, but the include user-interfaces for activation features that enable users to interact in response to the events or other occurrences with the organization. For example, an analyst may create an incident, resolve it, escalate it, bring in other required counterparts to resolve it, all the while each of the other persons involved or responsible for IT operations may be enabled to observe the status of the incident along with seeing how it may impact the business of the organization.

Figure 6:
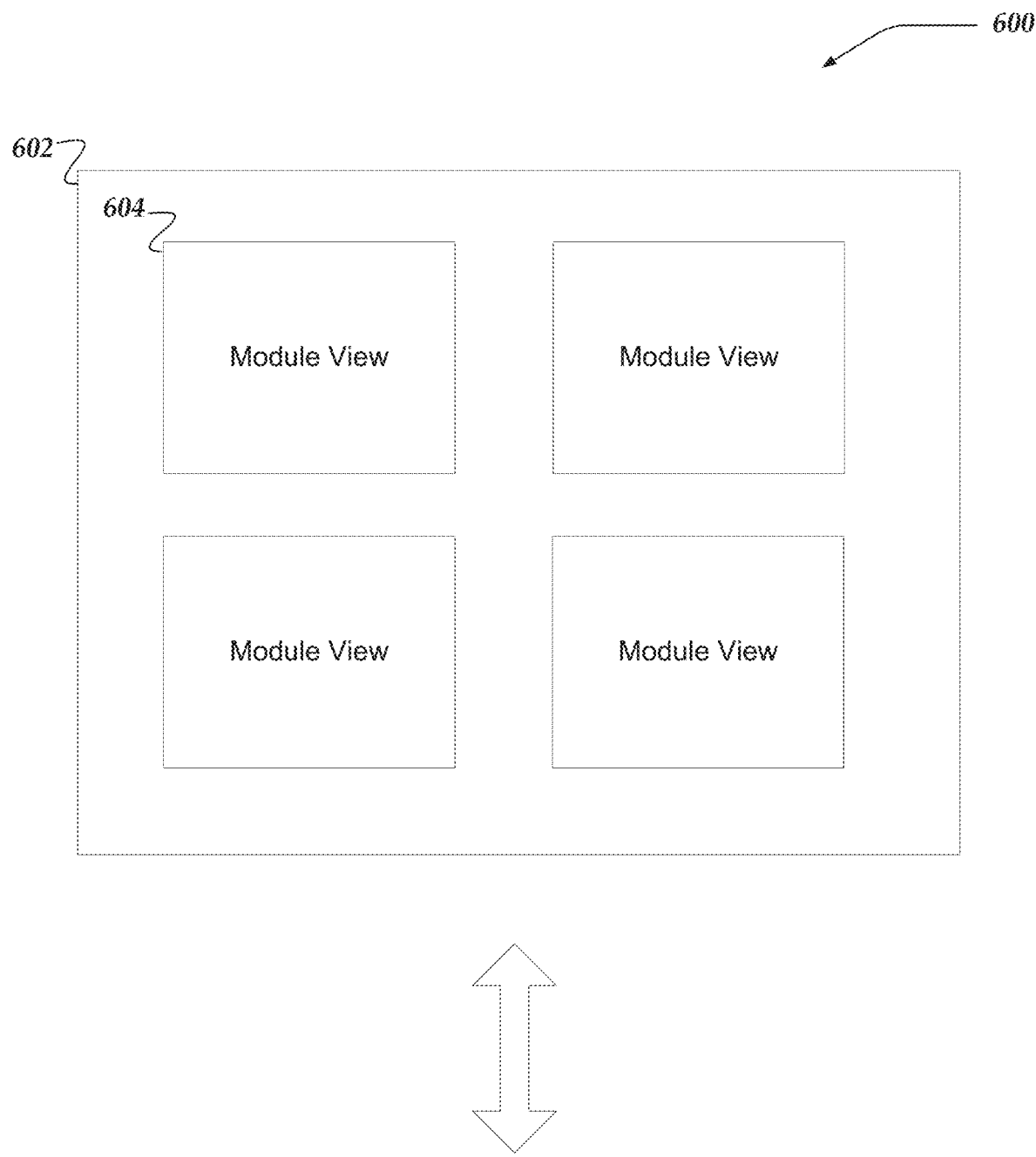
FIG. 6 illustrates a logical representation of an operations management system in accordance with one or more of the various embodiments.

FIG. 6 illustrates a logical representation of operations management system 600 in accordance with one or more of the various embodiments. In one or more of the various embodiments, as described above, operations command console 602 may be a container, virtual machine, process, applications, or the like, that may be running on client computer or network computer. In one or more of the various embodiments, one or more module views, such as, module view 604, that may be displayed for a given console module. In one or more of the various embodiments, module views may include visualizations, interactive reports, user-interfaces, or the like. In one or more of the various embodiments, users may view the state of IT operations as well as interact with the operations command console to provide information or input relative to ongoing incidents. In one or more of the various embodiments, the different module views may be arranged to automatically update as the state of an organizations IT operations may change.

In one or more of the various embodiments, each of the module views may be logically interconnected to provide pertinent and meaningful information about any situation experienced in the organization's IT system. For example, if user one chooses a particular business service, the operations command console may be arranged show everything else related to that service, such as associated event data, business value, the open incidents related to that service, or the like.

In one or more of the various embodiments, alternatively, one could choose a cluster of events through the Infrastructure Health Module and see all associated open incidents, related services, business impact, or the like.

In one or more of the various embodiments, console modules within the operations command console are not limited to be static views or reports, but activation features that enable users to interact in response to changes occurring in the organizations IT system. For example, an analyst may be enabled to create an incident, resolve it, escalate, bring in other required counterparts to resolve it, all the while each of the other roles or personas in the organization may view their own operations command console to see the status of that incident along with the criticality to the organization.

In one or more of the various embodiments, console modules may be arranged to provide one or more module views that enable a user to drill down to see additional detail or context provided by other console modules or other module views.

Figure 7:
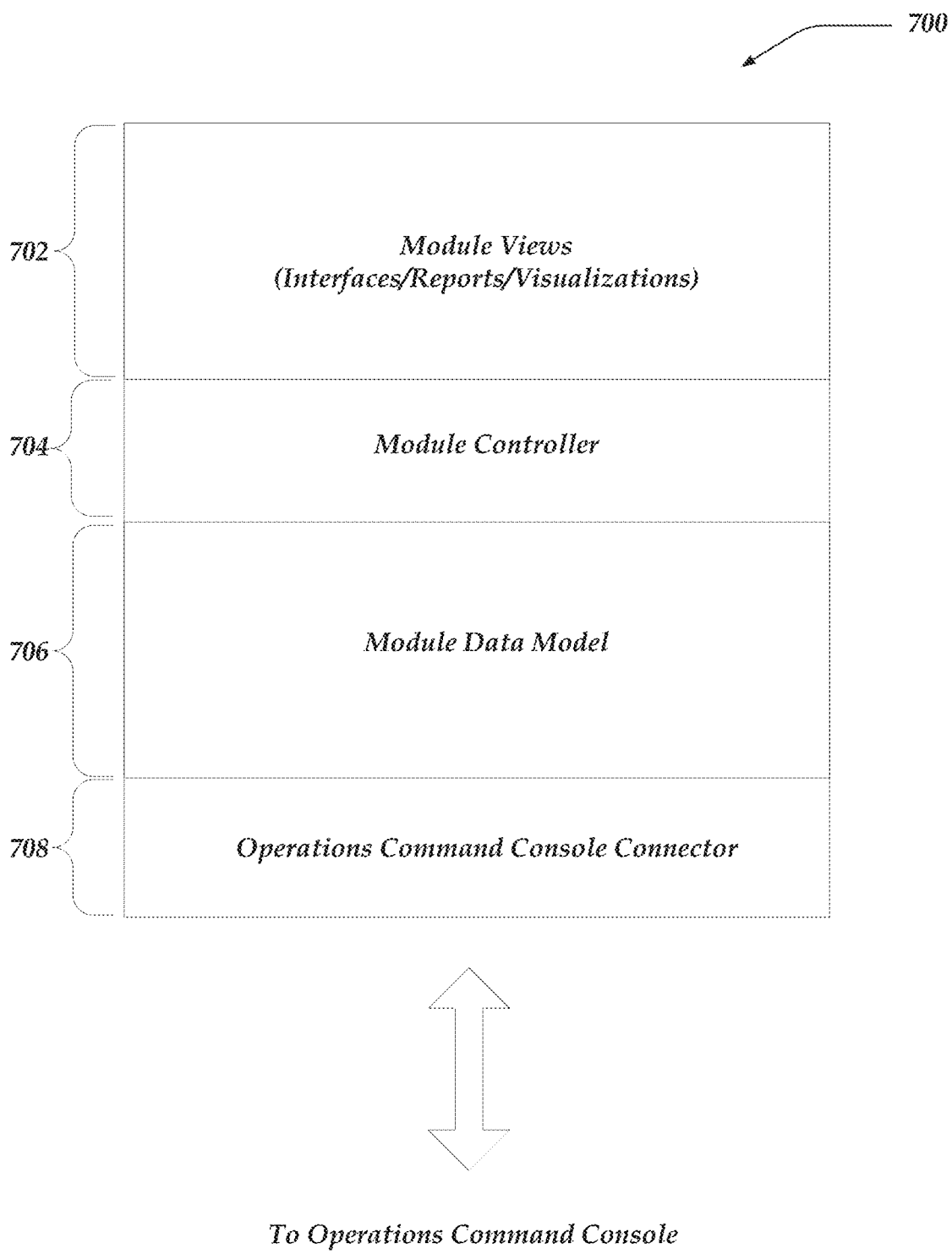
FIG. 7 illustrates a logical schematics of a console module that is in accordance with one or more of the various embodiments.

FIG. 7 illustrates a logical schematics of console module 700 that is in accordance with one or more of the various embodiments. In one or more of the various embodiments, console modules, such as, console module 700 may be arranged to include one or more module views 702, module controller 704, module data model 706, command console connector 708, or the like.

In one or more of the various embodiments, module view 702 may be arranged to provide user-interfaces, interactive reports, visualizations, or the like. In some embodiments, different console modules may share or otherwise have some of the same module views.

In one or more of the various embodiments, module controller 704 may be arranged to provide control functions that may be used to manage input/outputs for the various module views in a console module.

In one or more of the various embodiments, module data model 706 may be arranged to contain module data objects that may be based on the operations metrics used by the module views.

In one or more of the various embodiments, command console connector 708 may be arranged to manage to communication with an operations command console that may be hosting a console module.

Generalized Operations

FIGS. 8-11 represent the generalized operations for operations command consoles in accordance with one or more of the various embodiments. In one or more of the various embodiments, processes 800, 900, 1000, and 1100 described in conjunction with FIGS. 8-11 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, cloud compute instances, or the like may be utilized.

Figure 8:
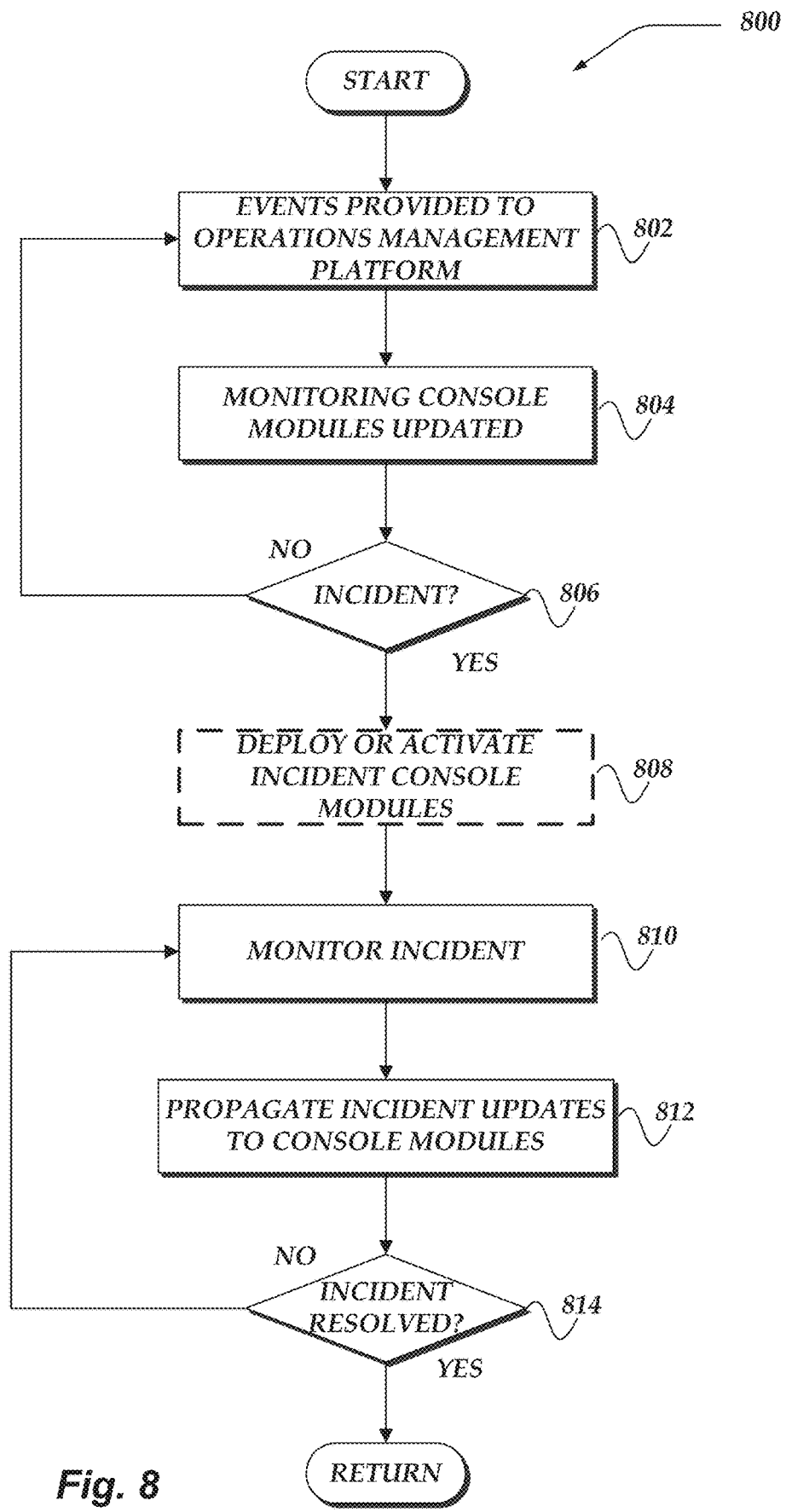
FIG. 8 illustrates an overview flowchart for a process for managing IP operations using an operations command console in accordance with one or more of the various embodiments.

FIG. 8 illustrates an overview flowchart for process 800 for managing IP operations using an operations command console in accordance with one or more of the various embodiments. After a start block, at block 802, in one or more of the various embodiments, one or more operations events may be provided to an operations management platform. As described above, an operations management platform may include one or more ingestion engines that may receive operations from various internal or external sources. As the events come into the system they may be processed by various components, including, clustering engines, modeling engines, resolutions trackers, operations engines, operations command consoles, or the like. In one or more of the various embodiments, various operations metrics may be produced based on operations events, incidents related to operations events, responses to incidents, or the like, or combination thereof.

At block 804, in one or more of the various embodiments, one or more operations command consoles may be arranged to update one or more monitoring console modules. In one or more of the various embodiments, operations engines may be arranged to respond to one or more changes in operations metrics by selectively communicating information such as, operations information, system status information, or the like, to one or more operations command consoles.

Accordingly, in one or more of the various embodiments, one or more console modules executing in the one or more operations command consoles may be arranged to update one or more of their module views in response to the information provided by the operations engine. In one or more of the various embodiments, one or more of these console modules may be considered monitoring console modules because they are arranged to provide insights in the organization's IT operations even in the absences of a pending incidents.

At decision block 806, in one or more of the various embodiments, if a new incident is discovered, control may flow to block 808; otherwise, control may loop back to block 802. In one or more of the various embodiments, updates to the one or more monitoring console modules may be observed or monitored by users. In one or more of the various embodiments, users may be monitoring operations command consoles that may be executing console modules appropriate or associated with their current operations role.

In one or more of the various embodiments, users may discover or observe indications that a new incident may be starting or is in progress. In one or more of the various embodiments, the operations command console may be configured to provide alarms or notifications based on one or more defined conditions. In other circumstances, users may employ interactive reports or visualizations provided by one or more of the console modules to navigate or drill down to explore the cause or source of the updated operations metrics. Accordingly, in one or more of the various embodiments, an incident may be identified based the user's analysis or one or more automated filters or conditions.

At block 808, in one or more of the various embodiments, optionally, one or more incident console modules may be deployed or activated. In one or more of the various embodiments, since a new incident is pending, the operations engine may be arranged to prepare one or more operations command consoles for use by one or more other users having various operations roles. Accordingly, in one or more of the various embodiments, the operations engine may be arranged to identify the appropriate console modules and deploy them to the appropriate operations command consoles.

In one or more of the various embodiments, in some cases, console modules may be deployed to operations command consoles if one or more users logon to an operations command console after being notified of the pending incident. In other cases, some users may already be logged on to an operations command console, that may or may not have the appropriate console modules installed or activated.

Note, this block is indicated as being optional because, in some embodiments, the required console modules may already be deployed or activated for a given user's operations command console.

At block 810, in one or more of the various embodiments, the operations command consoles may be employed to monitor the status of the incident. In one or more of the various embodiments, one or more operations command consoles may be arranged to enable one or more users having various operations roles to monitor the pending incidents. In some embodiments, some users may be enabled to interact with the operations management platform via the operations command console to directly participate in the management or resolution of the incident. In other cases, some users may simply be enabled to observe the status of the incident.

At block 812, in one or more of the various embodiments, one or more incident updates may be propagated to the one or more console modules. in one or more of the various embodiments, as the incident unfolds various operations metrics may change as the responsible resources perform actions to attempt to resolve or mitigate the incident. Accordingly, in one or more of the various embodiments, these changes may be fed back into the operations management platform resulting in the operations engine providing updated information to the one or more console modules running in the one or more operations command consoles.

Also, in one or more of the various embodiments, updates may be related to operations events received during the incident or user input provided via operations command consoles.

At decision block 814, in one or more of the various embodiments, if the incident is resolved, control may be returned to a calling process; otherwise, control may loop back block 810.

In one or more of the various embodiments, one or more users may be enabled to mark an incident as resolved depending on their role or their role's access rights. For example, in some embodiments, an incident commander may be empowered to make the final determination if an incident has been resolved.

In one or more of the various embodiments, if the incident is determined to be resolved, the operations engine may be arranged to receive incident status information from the resolution tracker. Accordingly, in some embodiments, the operations engine may be arranged to update the console modules accordingly.

Figure 9:
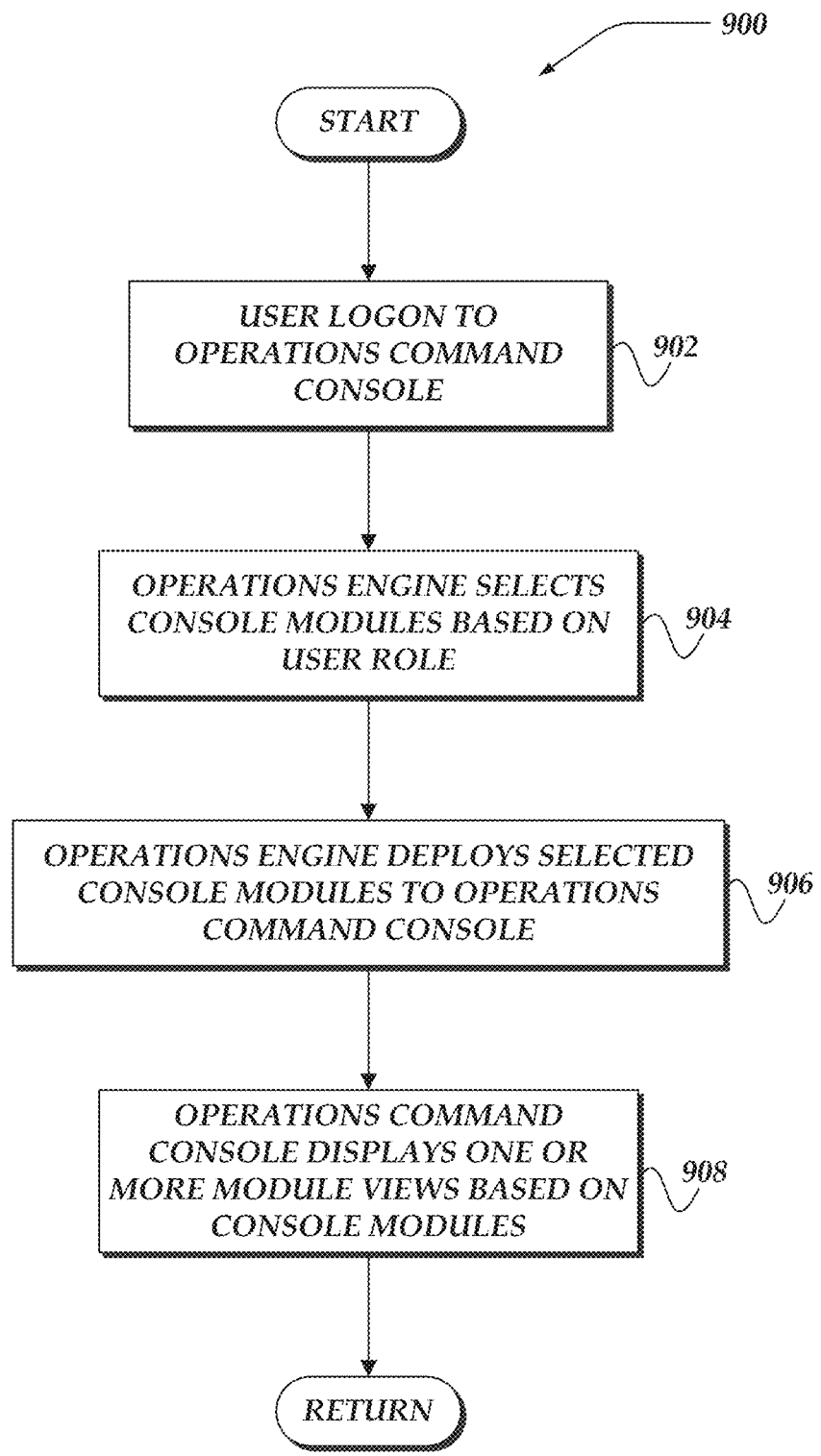
FIG. 9 illustrates a flowchart for a process for deploying or activating one or more console modules for an operations command console in accordance with one or more of the various embodiments.

FIG. 9 illustrates a flowchart for process 900 for deploying or activating one or more console modules for an operations command console in accordance with one or more of the various embodiments. After a start block, at block 902, in one or more of the various embodiments, a user may logon to an operations command console. In one or more of the various embodiments, operations command consoles may come in various forms, including native applications, web applications, or the like. In some embodiments, native applications may include client computer applications, network computer applications, mobile applications, or the like, running on a variety of operating systems or computer form factors.

In one or more of the various embodiments, a user may be authenticated by the operations command console. In one or more of the various embodiments, the user may be enabled to provide various credentials to authenticate with the operations command console. In one or more of the various embodiments, the credentials may include, usernames, passwords, biometric information (e.g., fingerprints, voice prints, retinal information, or the like), pin numbers, cryptographic certificates, device information/identities, or the like, or combination thereof.

In one or more of the various embodiments, the operations command console may authenticate the user based on their credentials. Accordingly, in some embodiments, access to one or more features of the operations command console may be provided to the user based on their access permissions.

In one or more of the various embodiments, the operations command console may be arranged to delegate user authentication to other services or applications, such as operations engines, external authentication services, or the like.

At block 904, in one or more of the various embodiments, an operations engine may be arranged to select one or more console modules based on the user's role. As described above, an operations management platform may have several different console modules available for execution in operations command consoles. However, in some embodiments, one or more of the console modules may be arranged for one or more operations role.

In one or more of the various embodiments, one or more console modules may be arranged to provide information, visualizations, user-interfaces, interactive reports, or the like, that may be designed for one or more particular operations roles. For example, in some embodiments, users in high level operations roles, such as, CEOs, CTOs, or the like, may benefit from console modules arranged to provide high level views of an organization's IT operations. In contrast, for example, a user in a front line devops role may require a close-in view of the service or application he or she is responsible for maintaining or repairing.

Accordingly, in one or more of the various embodiments, the operations engine may be arranged to map the user's operations role and access rights to one or more console modules. In one or more of the various embodiments, the operations engine may be arranged to employ configuration information that maps console modules to operations roles, access levels, teams, business units, groups, or the like, or combination thereof. In one or more of the various embodiments, the operations engine may be arranged to obtain this configuration information from one or more or configuration files, databases, rule-based policies, user-input, or the like, or combination thereof.

In some embodiments, individual console modules may be arranged to include one or more features or module views that may be restricted to specific users, roles, groups, or the like. Accordingly, in one or more of the various embodiments, console modules may be arranged to authenticate users to determine the module views to present to a user if any.

At block 906, in one or more of the various embodiments, the operations engine may be arranged to deploy or activate the one or more console modules for execution on an operations command console. In one or more of the various embodiments, operations command consoles may be arranged to be provided the console modules selected by the operations engine. Accordingly, in one or more of the various embodiments, the operations engine may be arranged locate and provide the selected console modules to the operations command console. In some embodiments, the operations engine may be arranged to provide the operations command console and the console modules to an operations command console hosting environment.

In one or more of the various embodiments, the operations engine may be arranged to compile the selected console modules from source code. In other embodiments, the operations engine may be arranged to bundle one or more of libraries, objects, databases, executables, configuration data, or the like, combination thereof, that may be required for the selected console modules. In some embodiments, the operations command console and its console modules may be containerized and provided to operations command consoles as virtual machines, quasi-virtual machines, other sandboxed environments, or the like.

In other embodiments, operations command consoles may be arranged to have some or all of the console modules available in an operations management platform pre-installed. Accordingly, in one or more of the various embodiments, the operations engine may be arranged to provide information such as a list of selected console modules that may be employed by the operations command console to load or instantiate the listed console modules.

In one or more of the various embodiments, the operations command console may be arranged to load or download the selected console modules from a remote repository. Also, in one or more of the various embodiments, the operations command console may be arranged to compile one or more of the selected console modules locally. In other embodiments, the operations command console may be arranged to obtain one or more of libraries, objects, databases, executables, configuration data, or the like, combination thereof, that may be required to instantiate the selected console modules from one or more repositories.

In one or more of the various embodiments, the list of selected console modules may be arranged include sufficient information to enable the operations command console to obtain and activate the required console modules. For example, in some embodiments, the list of selected console modules may include one or more fields for each console module, such as, console module name, location, credentials, target system characteristics (e.g., operating system, computer hardware, locale/language, or the like), version information, or the like, or combination thereof. In some embodiments, the provided information may be arranged to be sufficient to enable the operations command console to locate, obtain, or install the listed console modules.

At block 908, in one or more of the various embodiments, the operations command console may be arranged to display one or more module views based on the deployed console modules. As described above, in some embodiments, console modules may include one or more module views. Accordingly, in one or more of the various embodiments, if one or more console modules are activated in an operations command console, one or more corresponding module views may be instantiated or activated on or in the operations command console.

Next, control may be returned to a calling process.

Figure 10:
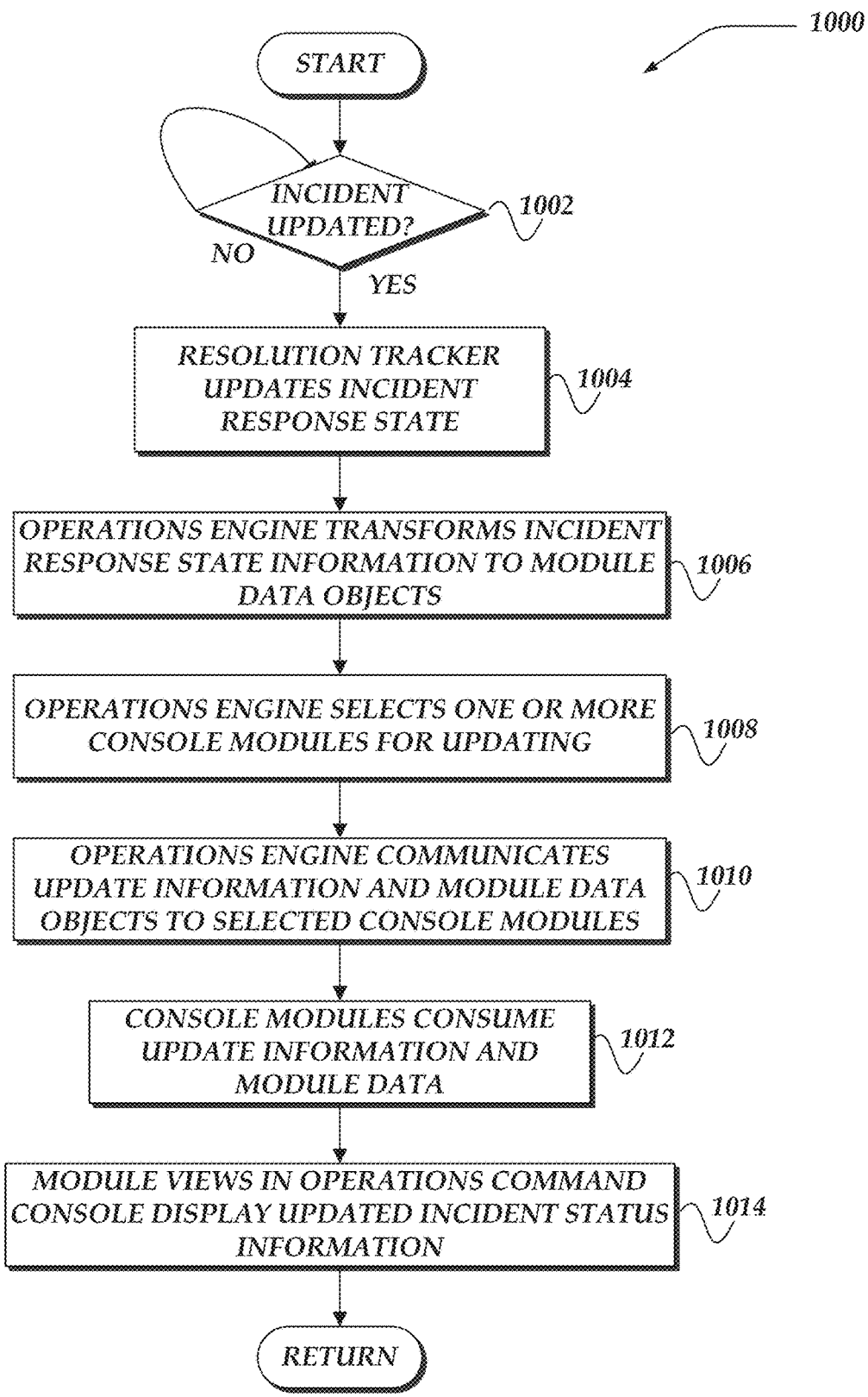
FIG. 10 illustrates a flowchart for a process for propagating incident updates to operations command consoles in accordance with one or more of the various embodiments.

FIG. 10 illustrates a flowchart for process 1000 for propagating incident updates to operations command consoles in accordance with one or more of the various embodiments. After a start block, at decision block 1002, in one or more of the various embodiments, if an incident is updated, control may flow to block 1004; otherwise, control may loop back to decision block 1002.

In one or more of the various embodiments, as described above, incidents may be continuously updated either by external inputs or responsible resource inputs (e.g., responder intervention). In one or more of the various embodiments, as an incident unfolds there may be changes in the operations events that the operations management platform may be receiving. For example, in one or more of the various embodiments, if one or more operations events closely related to the cause of an incident stop being received, it may indicate that the pending incident has been resolved. Likewise, in one or more of the various embodiments, changes in received operations events (e.g., changes in rate, changes in event type, changes in event payloads, or the like) may reflect changes that have occurred to the pending incident.

In one or more of the various embodiments, a key feature of the operations command consoles is that if one user performs one or more incident management actions via their operations command console, these actions may be fed back through the operations management platform. Accordingly, in one or more of the various embodiments, other console modules or other operations command consoles may continuously or automatically be updated as other users perform incident response actions or incident updates via their own console modules.

At block 1004 in one or more of the various embodiments, a resolution tracker may be arranged to update the incident response state based on the incident update. In one or more of the various embodiments, operations management platforms may be arranged to include one or more resolutions trackers that may track incident related events or user inputs. In one or more of the various embodiments, resolution tracker may be arranged to associated one or more events with one or more pending incidents. For example, in some embodiments, a resolution tracker may be arranged to monitor or measure the time between events, the time it take responders to achieve various resolution milestones, such as, the time it takes for notifications acknowledged, number of team members added to a incident response, types of events, source of events, or the like.

Accordingly, in one or more of the various embodiments, some or all resolution metrics tracked by the resolution tracker may be associated with one or more pending incidents. Accordingly, in one or more of the various embodiments, the resolution information may be used to update the current incident response state for one or more pending incidents.

At block 1006, in one or more of the various embodiments, an operations engine may be arranged to transform the incident response state information to one or more module data objects. In one or more of the various embodiments, the operations engine may be arranged to employ configuration information, such as, rule-based policies, filters, maps, conditions, threshold values, or the like, to transform operations information comprising pending incident state into one or more module data objects that conform to a consistent schema. Likewise, in one or more of the various embodiments, console modules may be arranged to recognize the schema used to define module data objects.

Accordingly, in one or more of the various embodiments, one or more different console modules may be arranged to use the same module data objects. Thus, in one or more of the various embodiments, the same module data objects may be used for different console modules rather than having to transform incident response state data into different kinds of objects for each console module. This optimization reduces the required storage space, network bandwidth (e.g., when communicating module data objects to operations command consoles), improves interoperability of console modules, or the like. For example, new console modules may be designed to use existing module data objects. Also, in one or more of the various embodiments, the operations engine may be arranged provide module data objects suitable for console modules or operations command consoles without impacting other data interfaces or data schema used in the operations management platform.

At block 1008, in one or more of the various embodiments, the operations engine may be arranged to select one or more console modules for updating. In one or more of the various embodiments, operations engines may be arranged to maintain a registry or the like of deployed console modules. Accordingly, in one or more of the various embodiments, it may be enabled to identify the one or more console modules that may need to be updated.

In one or more of the various embodiments, the operations engine may be arranged buffer, or aggregate one or more incident status updates. In one or more of the various embodiments, the operations engine may be arranged delay forwarding update information to defined time widows having fixed delays. For example, in some embodiments, the operations engine may be configured to select console modules for updating if they have not been updated within a given time, such as, 20 seconds. In other embodiments, for example, operations engines may be arranged to update all console modules every 10 seconds.

Further, in one or more of the various embodiments, individual console modules may be configured with different updating control criteria. In some cases, update control criteria may be tied to the type of state information, the content of the state information, the roles of a given user associated with a given console module, or the like, or combination thereof.

At block 1010, in one or more of the various embodiments, the operation engine may be arranged to communicate the update information and module data objects to the selected console modules. In one or more of the various embodiments, operations engine may communicate the update information or module data objects to the individual console modules hosted on various operations command consoles. In some embodiment, the update information or module data objects may be provided to operations command consoles hosting the console modules Accordingly, in one or more of the various embodiments, the operations command consoles may be responsible for sharing the update information and module data objects with its hosted console modules.

At block 1012, in one or more of the various embodiments, the one or more selected console modules may consume the update information and the module data objects provided by the operations engine.

At block 1014, in one or more of the various embodiments, one or more module views in one or more operations command consoles may be arranged to display updated incident status information. Next, control may be returned to a calling process.

Figure 11:
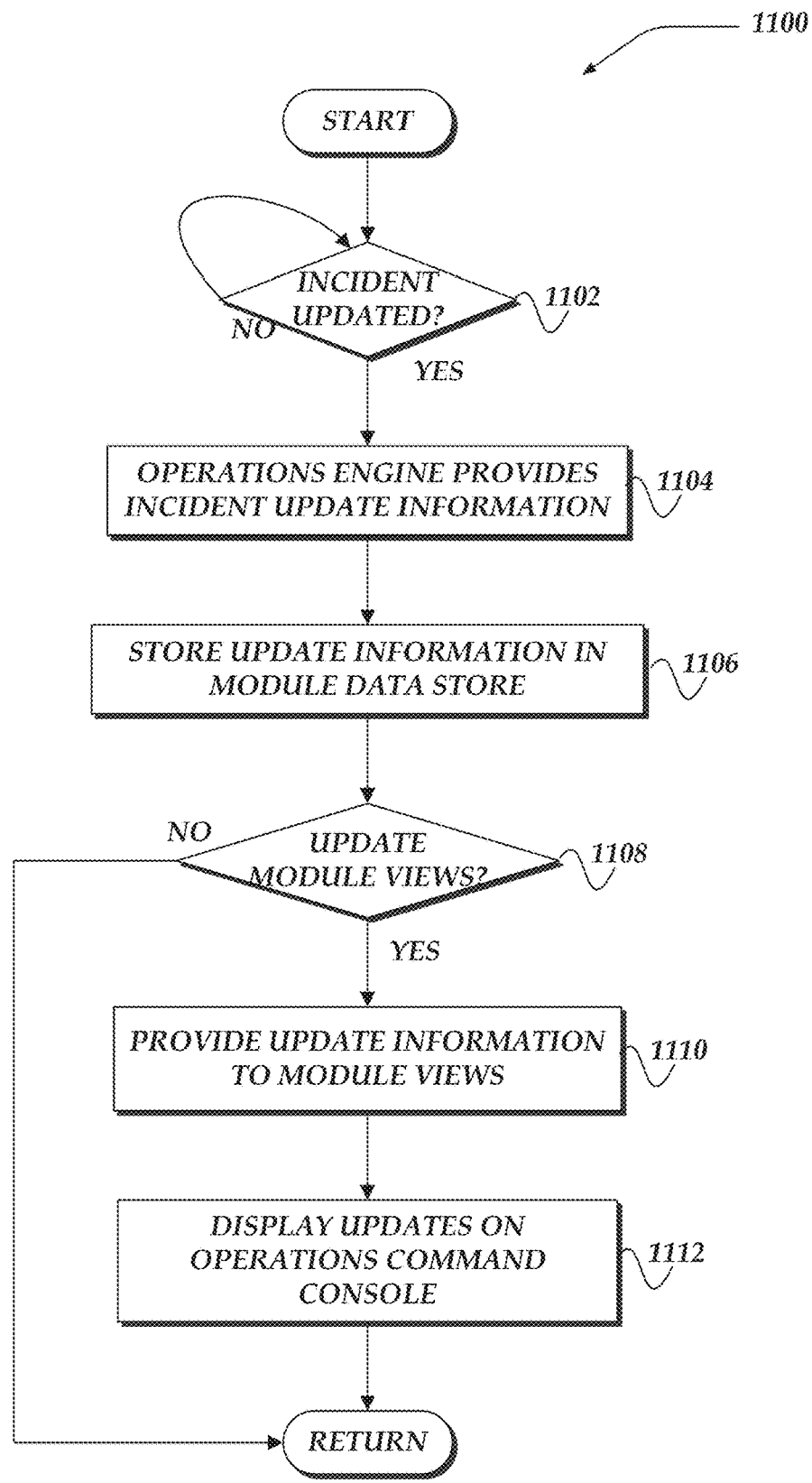
FIG. 11 illustrates a flowchart for a process for propagating incident update information to module views in accordance with one or more of the various embodiments.

FIG. 11 illustrates a flowchart for process 1100 for propagating incident update information to module views in accordance with one or more of the various embodiments. After a start block, at decision block 1102, in one or more of the various embodiments, if an incident is updated, control may flow to block 1104; otherwise, control may loop back to decision block 1102. As described above, the operations management platform may be arranged to continuously update the status of pending incidents.

At block 1104, in one or more of the various embodiments, the operations engine may be arranged to provide incident update information to the operations command console. As described above, the operations engine may provide incident update information to one or more selected console modules or operations command consoles hosting one or more console modules.

In one or more of the various embodiments, the update information may include incident update information in the form of one or more module data objects. In some embodiments, the module data objects may be communicated using a communication protocol that is compatible with the operations command console connectors used by the console modules.

At block 1106, in one or more of the various embodiments, the console module may store the update information in the module data store. In one or more of the various embodiments, console modules may be arranged to store a copy of some or all of the update information or module data objects provided to each console modules. In one or more of the various embodiments, console modules may be arranged to establish references to some or all of update information or module data objects that may be held in a shared storage of the operations command console rather than copies.

At decision block 1108, in one or more of the various embodiments, if one or more module views need to be updated, control may flow to block 1110; otherwise, control may be returned to a calling process. In one or more of the various embodiments, console modules may be arranged to determine if their one or more module views should be updated. Accordingly, console modules may be arranged to employ configuration information to determine if one or more of its module views should be updated. In some embodiments, console modules may be configured to throttle or filter updates such that some or all module views may be updated if the throttle or filtering conditions are met. For example, in some embodiments, one or more module views may be configured to update only if a change value quantity exceeds a defined threshold.

In one or more of the various embodiments, console modules may be arranged to limit updates to module views that may be visible or otherwise active. Accordingly, in one or more of the various embodiments, inactive or hidden module views may be omitted from being updated until they become active or visible.

At block 1110, in one or more of the various embodiments, the update information may be provided to the one or more module views. In one or more of the various embodiments, console modules may be arranged to include a module controller. Accordingly, in one or more of the various embodiments, the module controller may be arranged to provide the update information to the one or more module views that may be eligible for being updated.

At block 1112, in one or more of the various embodiments, information displayed on one or more module views may be updated and displayed on the operations command console. Accordingly, in one or more of the various embodiments, each module view may be independently arranged to generate visualizations that corresponding the scope and context associated with the users role.

Next, control may be returned to a calling process.

Accordingly, in one or more of the various embodiments, the resolution modeling engine may increment or decrement that quality score of a resolution model based on user feedback. in one or more of the various embodiments, configuration information may include one or more functions that provide a quality score based on user feedback related to particular resolution models. Accordingly, resolution models that are consistently producing less-relevant results may have their quality score value reduced. Likewise, resolution models that do not require correction may have their quality score value increased. Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Illustrative Use Cases

In one or more of the various embodiments, operations management platform that include operations command consoles may be arranged to provide different views of an organization's IT operations. Accordingly, in one or more of the various embodiments, users having different roles may be presented a picture of the system that is tailored to their own roles. In some embodiments, the same data (e.g., module data objects, operations events, operation metrics, or the like) may be employed to produce very different user experiences that reflect the differences between the console modules or module views being executed in the operations command consoles employed by users.

Figure 12:
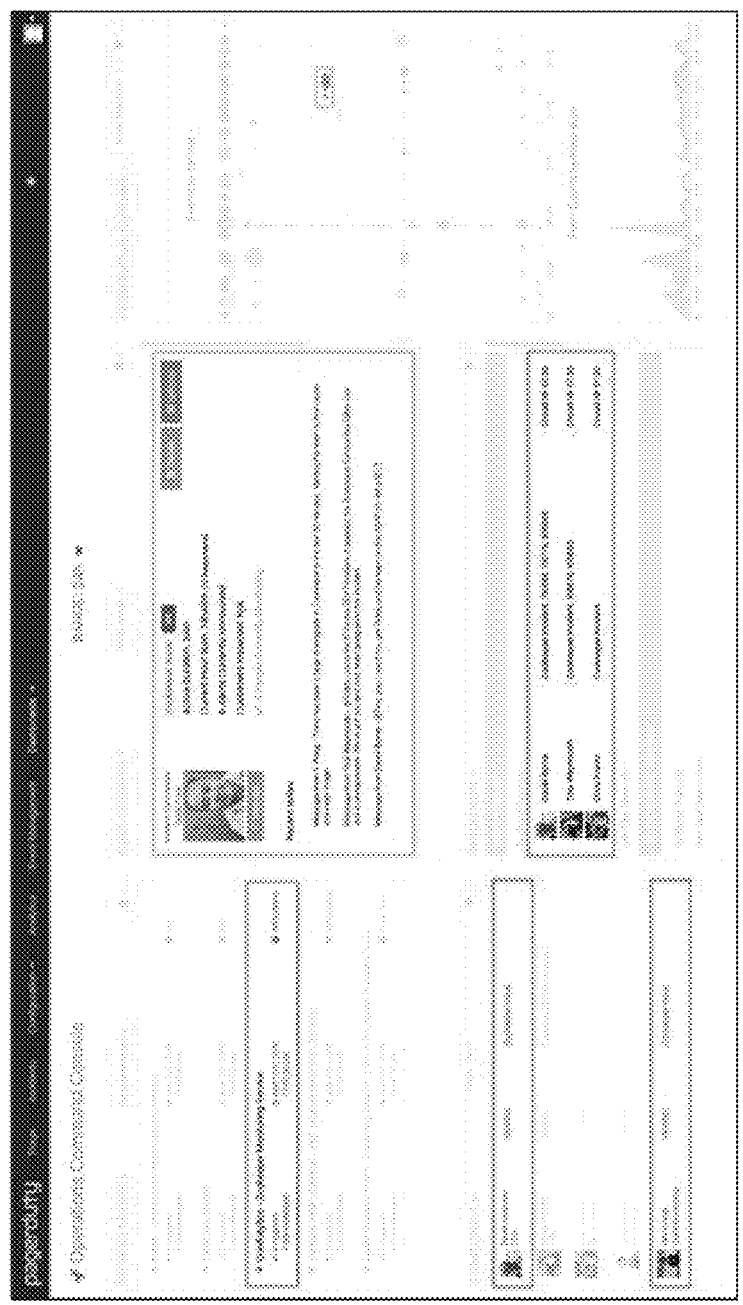
FIG. 12 illustrates an operations command console that is in accordance with one or more of the various embodiments.

NOC Manager OCC Use Case:

FIG. 12 illustrates operations command console 1200 (OCC) that is in accordance with one or more of the various embodiments.

In this example, the NOC Manager is in charge of the team that orchestrates Incident Response and as such needs a holistic view of the state of their Infrastructure across the various contexts. Reviewing the OCC, she first reviews the list of open Incidents. Hovering over each of the 2 major open incidents and 3 minor open incidents provides her with quick insight into the status of the remediation efforts. Her main focus is on status of the remediation efforts and length of time open. Seeing that the Zookeeper Monitoring Service has been open for 3 hours, she clicks on Focus.

By focusing into the situation through the Open Incidents module, the NOC manager sees the Incident Commander associated with the Incident, summary metrics, and any notes relating to the remediation efforts, as shown below.

Figure 13:
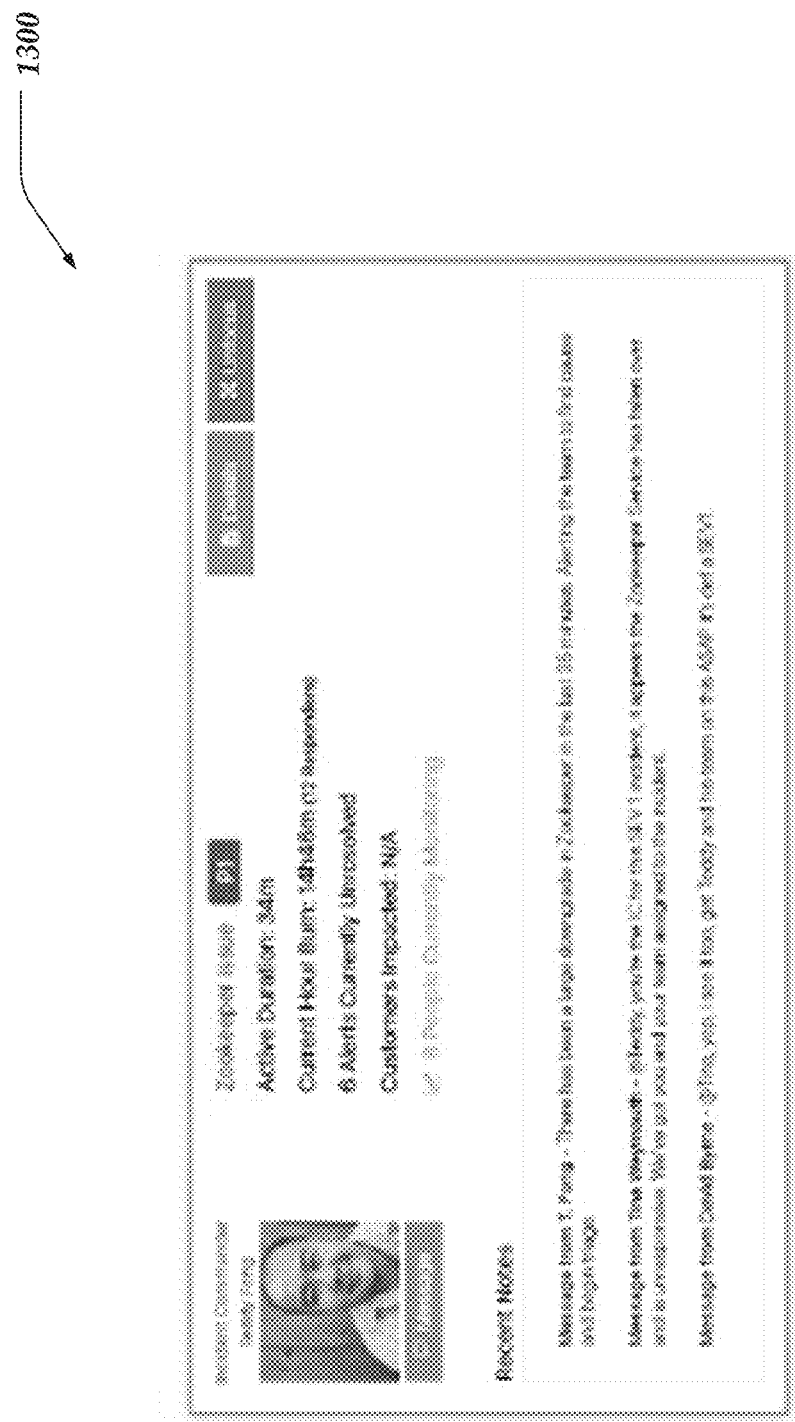
FIG. 13 illustrates a detail view of an operations command console that is in accordance with one or more of the various embodiments.

FIG. 13 illustrates detail view 1300 of operations command console 1200 (OCC) that is in accordance with one or more of the various embodiments.

When the NOC manager clicks on Focus in the Open Incidents module context, she also causes the other modules to reflect all available information relating to the Zookeeper Monitoring Incident.

In the Services module, the Zookeeper Monitoring Service comes into focus showing a quick synopsis of associated alerts, last time of update, and Service owner.

Figure 14A:
FIG. 14A illustrates a detail view for an operations command console that is in accordance with one or more of the various embodiments.

FIG. 14A illustrates detail view 1400 for operations command console 1200 (OCC) that is in accordance with one or more of the various embodiments.

The Stakeholder (i.e. Business Unit Owner and CEO/CFO/CTO) module reflects the Business Stakeholders whose Business Units are dependent on and affected by the Zookeeper Service outage. The Stakeholder context provides a summary of the person, title, and the time left to next update as per the company's major Incident escalation process.

Figure 14B:
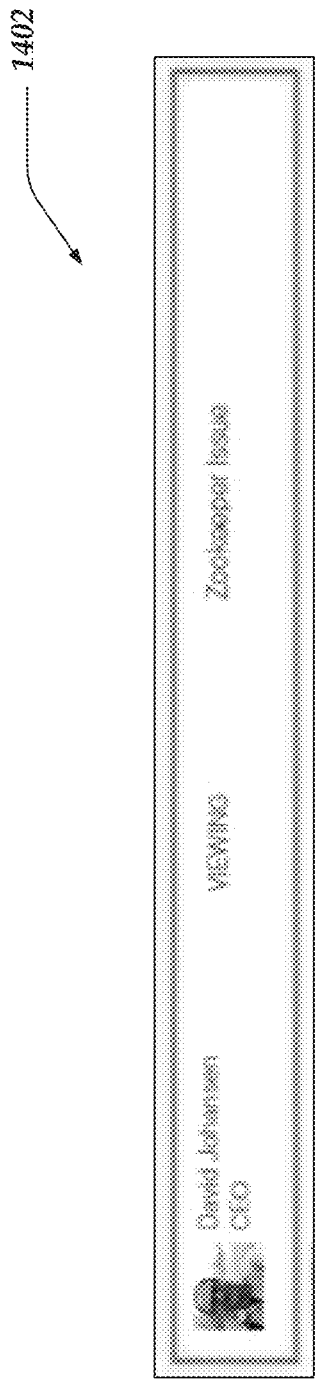
FIG. 14B illustrates a detail view for an operations command console that is in accordance with one or more of the various embodiments.

FIG. 14B illustrates detail view 1402 for operations command console 1200 (OCC) that is in accordance with one or more of the various embodiments.

The Infrastructure Health module also updates to show the cluster of alerts associated with the Incident and the NOC Manager quickly reviews any possible correlation to existing alert clusters that are visible during this same time window.

Figure 15:
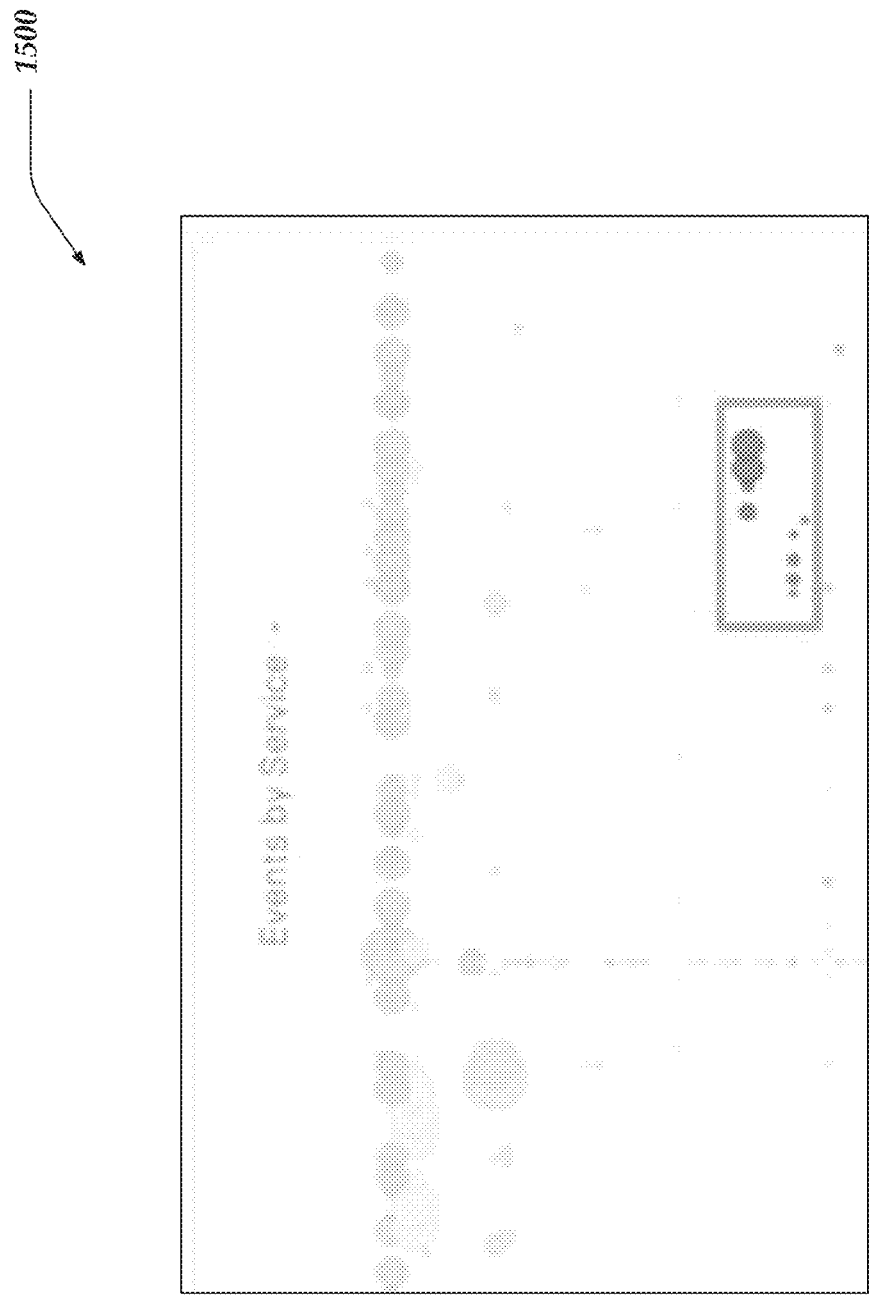
FIG. 15 illustrates an example of a cluster view in an operations command console that is in accordance with one or more of the various embodiments.

FIG. 15 illustrates an example of cluster view 1500 in operations command console 1200 (OCC) that is in accordance with one or more of the various embodiments.

The time-frequency analyzed event data driving this display of clustered alerts is also used for measurements of the overall dynamic behavior of the situation. Cluster properties, such as frequency, duration, spatial distribution across related sources/services, information extracted from associated event message fields, etc. are applied to a heuristic model trained with historic information. The output of the model includes predicted resolution metrics and remediation information, such as time to resolve, number of responders to resolve, teams assigned, remediation notes, and root-cause analysis. This information can be used in a powerful way to expedite incident remediation, avoid downtime, and inform the IT operations which situations are most important to resolve based on impact to the business.

This predicted remediation information is displayed in the OCC as a toggled feature with the Infrastructure Health Module (IHM), as shown below.

Figure 16:
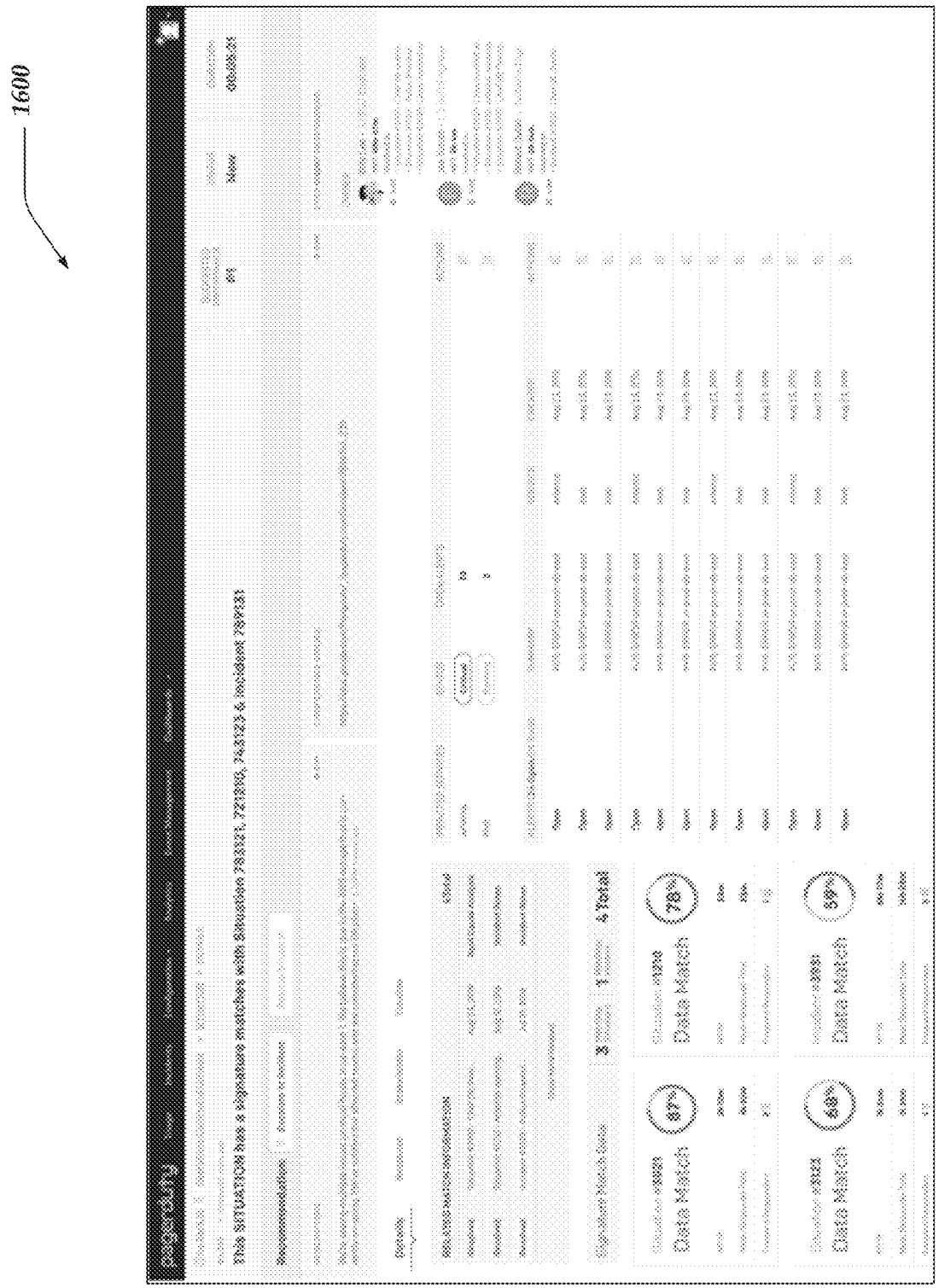
FIG. 16 illustrates a predicted remediation view in an operations command console that is in accordance with one or more of the various embodiments.

FIG. 16 illustrates predicted remediation view in operations command console 1200 (OCC) that is in accordance with one or more of the various embodiments.

By viewing all modules in context of the Zookeeper Service outage Incident, the NOC Manager has much better situational awareness of the scope of the Incident and the remediation efforts of all involved. They can also very quickly understand the state of their IT Operations across the entire Infrastructure.

L1/L2 responders OCC use case:

An L1/L2 responder on shift in the NOC actively monitors the OCC for the beginning stages of an alert cluster displayed in the Infrastructure Health Module. The L1/L2 may click on a cluster in the IHM to see a list of the alerts associated with the cluster, as well as the predicted remediation information to be used as a guide.

After reviewing this information, they determine that the cluster is worthy of deeper investigation (i.e. potentially actionable), and in turn associate the alerts in the cluster with a new Incident for the impacted Service. The on-call or on-duty Responder is alerted to the Incident and initiates the Incident Triage and Remediation effort. After generating the Incident, the L1/L2 responder adds notes to the incident describing his investigation effort so far, and an assessment of impact. The first responder can review detailed information for the active alerts associated with the Incident and use that information to determine whether an Incident is major and requires an Incident Commander.

If they determine that the Incident is Major, they migrate the Incident to the company's Potential Critical Service which alerts the on-call Incident Commander. Once the on-call Incident Commander reviews the Incidents and determines that it is major, they move the Incident to the Critical Incidents Service and begin orchestrating the Incident Response.

The on-call Incident Commander is alerted to the potential Incident and quickly reviews the OCC in that Incident context. They determine that this Incident does not seem to be related to any other open Incidents and opens the Incident Commander Console to begin the Incident Response and Remediation efforts.

During triage the first responder sees all active alerts across the services they manage, giving them a unified perspective of what all of their monitoring systems are reporting. The first responder can review detailed information for the active alerts, and groups together alerts that are related to the same underlying cause. After assessing that the grouped alerts show indications of customer impact, the first responder recruits an incident commander to drive the incident to resolution. After receiving his page, the incident commander joins the included conference bridge. While doing this, he reviews the incident details: the updated summary, the triage notes from the first responder, and also looking at the alerts attached to the incident. Based on this information, the incident commander decides which teams need to be involved, and recruits the on-call from each team. While the various embodiments of the invention reach out to the on-calls, the IC sets up a timed reminder for when the first status update should be sent to internal stakeholders.

As responders receive their pages and join the conference bridge, they also review the incident's details using the captured notes to quickly come up to speed. They see the attached alerts, and from the listing that shows which alerts are open and which have already resolved, know which parts of the affected system have already returned to normal. This informs how the responders will investigate to find the cause of the issue. As the discoveries, actions, and decisions are taken, the IC adds them to the incident record as notes. This helps any responders that subsequently join the incident, and will also be essential when the incident's post-mortem is assembled later.

What is claimed as new and desired to be protected by Letters Patent of the United States is:

1. A method for managing operations over a network using one or more network computers that include one or more processors that perform actions, comprising:
   instantiating an operations engine to perform actions, including:
      providing one or more operations metrics based on one or more events and one or more resolution actions, wherein the one or more operations metrics are associated with an incident, and wherein an ingestion engine is employed to normalize data for each operations metric, and wherein a modeling engine is employed to provide a schema that is used to transform the normalized data into a schema which is based on one or more model objects;
      transforming the one or more operations metrics into update information, wherein the update information includes one or more data objects that conform to the schema; and
      providing the update information to one or more console modules included in one or more operations command consoles (OCCs), wherein each of the one or more console modules includes one or more module views, and wherein each console module and each module view is associated with one or more of a plurality of roles for one or more users; and
   employing the one or more console modules to provide the one or more data objects to one or more module views, wherein the one or more module views are associated with the one or more console modules;
   providing a user interface to a user of one or more specific console modules that present specific module views as one or more different visualizations of the incident based on each role that corresponds to the user;

employing one of the one or more OCCs to provide one or more other resolution actions by the user to the operations engine, wherein the operations engine provides additional update information to the one or more console modules based on the one or more other resolution actions, and wherein each module view that corresponds to each role of one or more other users is automatically updated with the additional update information that is based on the one or more resolution actions by the user;

in response to a notification of a new incident, performing further actions, including:
employing cluster properties of historic time-frequency event data to train a heuristic model, wherein an output of the heuristic model provides one or more of a prediction of remediation metrics or a prediction of remediation information for the new incident; and
automatically determining one or more incident console modules that provide navigation of one or more causes of the new incident, wherein the one or more incident console modules are automatically included in the one or more OCCs, and wherein the one or more incident modules include one or more of the predicted remediation metrics or the predicted remediation information; and employing geolocation information from a Global Positioning System (GPS) device at a client computer to determine one or more features that are included in the specific console module views for a user to improve the user's understanding of the views, wherein the features include one or more of time zones, languages, currencies, or calendar formatting that is displayed to the user of the client computer when the client computer is located at a particular geo-location.

2. The method of claim 1, wherein the operations engine performs further actions, comprising:
associating the user with the role based on a mapping of users to roles; and
selecting the one or more console modules based on the role that is associated with the user.

3. The method of claim 1, wherein employing the one or more console modules to provide the one or more data objects to the one or more module views, further comprises:
accumulating update information that is provided by the operations engine, wherein one or more values associated with the accumulated update information exceeds a defined threshold; and
providing the one or more data objects included in the accumulated update information to the one or more module views.

4. The method of claim 1, further comprising:
employing the one or more OCCs to authenticate one or more users; and
employing the operations engine, to perform further actions, comprising:
identifying the one or more roles that correspond to the one or more users;
selecting the one or more console modules based on the one or more roles and the one or more users; and
deploying the one or more console modules on the one or more OCCs.

5. The method of claim 1, wherein employing the one of the one or more OCCs to provide the one or more other resolution actions to the operations engine further comprises:

employing the one or more module views to perform further actions, including:
displaying one or more user-interfaces based on the one or more data objects;
capturing one or more user-interface events based on one or more actions of a user; and
providing the one or more other resolution actions based on the one or more user-interface events and the one or more data objects.

6. The method of claim 1, wherein the one or more operations metrics associated with the incident, further comprises, one or more of, a time-to-resolve value, a number of responders required to resolve, one or more names of responders or teams required to resolve, or a priority of the incident in terms of operations and business impact.

7. The method of claim 1, further comprising, employing the operations engine to perform actions, including:
compiling the one or more console modules from one or more of source code, software libraries, objects, databases, executables, or configuration data;
bundling the one or more console modules and the one or more OCCs into one or more virtual machines; and
deploying the one or more virtual machines on one or more client computers or one or more network computers.

8. A system for managing operations for organizations over a network, comprising:
a network computer, comprising:
a transceiver that communicates over the network;
a memory that stores at least instructions; and
one or more processors that execute instructions that perform actions, including:
instantiating an operations engine to perform actions, including:
providing one or more operations metrics based on one or more events and one or more resolution actions, wherein the one or more operations metrics are associated with an incident, and wherein an ingestion engine is employed to normalize data for each operations metric, and wherein a modeling engine is employed to provide a schema that is used to transform the normalized data into a schema which is based on one or more model objects;
transforming the one or more operations metrics into update information, wherein the update information includes one or more data objects that conform to the schema; and
providing the update information to one or more console modules included in one or more operations command consoles (OCCs), wherein each of the one or more console modules includes one or more module views, and wherein each console module and each module view is associated with one or more of a plurality of roles for one or more users; and
employing the one or more console modules to provide the one or more data objects to one or more module views, wherein the one or more module views are associated with the one or more console modules;
providing a user interface to a user of one or more specific console modules that present specific module views as one or more different visualizations of the incident based on each role that corresponds to the user;

employing one of the one or more OCCs to provide one or more other resolution actions by the user to the operations engine, wherein the operations engine provides additional update information to the one or more console modules based on the one or more other resolution actions, and wherein each module view that corresponds to each role of one or more other users is automatically updated with the additional update information that is based on the one or more resolution actions by the user;

in response to a notification of a new incident, performing further actions, including:

employing cluster properties of historic time-frequency event data to train a heuristic model, wherein an output of the heuristic model provides one or more of a prediction of remediation metrics or a prediction of remediation information for the new incident; and automatically determining one or more incident console modules that provide navigation of one or more causes of the new incident, wherein the one or more incident console modules are automatically included in the one or more OCCs, and wherein the one or more incident modules include one or more of the predicted remediation metrics or the predicted remediation information; and employing geolocation information from a Global Positioning System (GPS) device at a client computer to determine one or more features that are included in the specific console module views for a user to improve the user's understanding of the views, wherein the features include one or more of time zones, languages, currencies, or calendar formatting that is displayed to the user of the client computer when the client computer is located at a particular geo-location; and another network computer, comprising:
another transceiver that communicates over the network;
another memory that stores at least instructions; and
one or more processors that execute instructions that perform actions, including:
generating the one or more events.

9. The system of claim 8, wherein the operations engine performs further actions, comprising:
associating the user with the role based on a mapping of users to roles; and
selecting the one or more console modules based on the role that is associated with the user.

10. The system of claim 8, wherein employing the one or more console modules to provide the one or more data objects to the one or more module views, further comprises:
accumulating update information that is provided by the operations engine, wherein one or more values associated with the accumulated update information exceeds a defined threshold; and
providing the one or more data objects included in the accumulated update information to the one or more module views.

11. The system of claim 8, wherein the one or more network computer processors execute instructions that perform actions, further comprising:
employing the one or more OCCs to authenticate the one or more users; and
employing the operations engine, to perform further actions, comprising:
identifying the one or more roles that correspond to the one or more users;
selecting the one or more console modules based on the one or more roles and the one or more users; and
deploying the one or more console modules on the one or more OCCs.

12. The system of claim 8, wherein employing the one of the one or more OCCs to provide the one or more other resolution actions to the operations engine further comprises:
employing the one or more module views to perform further actions, including:
displaying one or more user-interfaces based on the one or more data objects;
capturing one or more user-interface events based on one or more actions of a user; and
providing the one or more other resolution actions based on the one or more user-interface events and the one or more data objects.

13. The system of claim 8, wherein the one or more operations metrics associated with the incident, further comprises, one or more of, a time-to-resolve value, a number of responders required to resolve, one or more names of responders or teams required to resolve, or a priority of the incident in terms of operations and business impact.

14. The system of claim 8, wherein the one or more network computer processors execute instructions that perform actions, further comprising:
employing the operations engine to perform actions, including:
compiling the one or more console modules from one or more of source code, software libraries, objects, databases, executables, or configuration data;
bundling the one or more console modules and the one or more OCCs into one or more virtual machines; and
deploying the one or more virtual machines on one or more client computers or one or more network computers.

15. A processor readable non-transitory storage media that includes instructions for managing operations for organizations over a network, wherein execution of the instructions by one or more hardware processors performs actions, comprising:
instantiating an operations engine to perform actions, including:
providing one or more operations metrics based on one or more events and one or more resolution actions, wherein the one or more operations metrics are associated with an incident, and wherein an ingestion engine is employed to normalize data for each operations metric, and wherein a modeling engine is employed to provide a schema that is used to transform the normalized data into a schema which is based on one or more model objects;
transforming the one or more operations metrics into update information, wherein the update information includes one or more data objects that conform to the schema; and
providing the update information to one or more console modules included in one or more operations command consoles (OCCs), wherein each of the one or more console modules includes one or more module views, and wherein each console module and each module view is associated with one or more of a plurality of roles for one or more users; and employing the one or more console modules to provide the one or more data objects to one or more module views, wherein the one or more module views are associated with the one or more console modules;

providing a user interface to a user of one or more specific console modules that present specific module views as one or more different visualizations of the incident based on each role that corresponds to the user;

employing one of the one or more OCCs to provide one or more other resolution actions by the user to the operations engine, wherein the operations engine provides additional update information to the one or more console modules based on the one or more other resolution actions, and wherein each module view that corresponds to each role of one or more other users is automatically updated with the additional update information that is based on the one or more resolution actions by the user;

in response to a notification of a new incident, performing further actions, including:

employing cluster properties of historic time-frequency event data to train a heuristic model, wherein an output of the heuristic model provides one or more of a prediction of remediation metrics or a prediction of remediation information for the new incident; and automatically determining one or more incident console modules that provide navigation of one or more causes of the new incident, wherein the one or more incident console modules are automatically included in the one or more OCCs, and wherein the one or more incident modules include one or more of the predicted remediation metrics or the predicted remediation information; and employing geolocation information from a Global Positioning System (GPS) device at a client computer to determine one or more features that are included in the specific console module views for a user to improve the user's understanding of the views, wherein the features include one or more of time zones, languages, currencies, or calendar formatting that is displayed to the user of the client computer when the client computer is located at a particular geo-location.

16. The media of claim 15, wherein the operations engine performs further actions, comprising:

associating the user with the role based on a mapping of users to roles; and selecting the one or more console modules based on the role that is associated with the user.

17. The media of claim 15, wherein employing the one or more console modules to provide the one or more data objects to the one or more module views, further comprises:

accumulating update information that is provided by the operations engine, wherein one or more values associated with the accumulated update information exceeds a defined threshold; and providing the one or more data objects included in the accumulated update information to the one or more module views.

18. The media of claim 15, further comprising:

employing the one or more OCCs to authenticate the one or more users; and employing the operations engine, to perform further actions, comprising:

identifying the one or more roles that correspond to the one or more users;

selecting the one or more console modules based on the one or more roles and the one or more users; and deploying the one or more console modules on the one or more OCCs.

19. The media of claim 15, wherein employing the one of the one or more OCCs to provide the one or more other resolution actions to the operations engine further comprises:

employing the one or more module views to perform further actions, including:

displaying one or more user-interfaces based on the one or more data objects;

capturing one or more user-interface events based on one or more actions of a user; and providing the one or more other resolution actions based on the one or more user-interface events and the one or more data objects.

20. The media of claim 15, wherein the one or more operations metrics associated with the incident, further comprises, one or more of, a time-to-resolve value, a number of responders required to resolve, one or more names of responders or teams required to resolve, or a priority of the incident in terms of operations and business impact.

21. The media of claim 15, further comprising, employing the operations engine to perform actions, including:

compiling the one or more console modules from one or more of source code, software libraries, objects, databases, executables, or configuration data;

bundling the one or more console modules and the one or more OCCs into one or more virtual machines; and deploying the one or more virtual machines on one or more client computers or one or more network computers.

22. A network computer for managing operations for organizations over a network, comprising:

a transceiver that communicates over the network;

a memory that stores at least instructions; and one or more processors that execute instructions that perform actions, including:

instantiating an operations engine to perform actions, including:

providing one or more operations metrics based on one or more events and one or more resolution actions, wherein the one or more operations metrics are associated with an incident, and wherein an ingestion engine is employed to normalize data for each operations metric, and wherein a modeling engine is employed to provide a schema that is used to transform the normalized data into a schema which is based on one or more model objects;

transforming the one or more operations metrics into update information, wherein the update information includes one or more data objects that conform to the schema; and providing the update information to one or more console modules included in one or more operations command consoles (OCCs), wherein each of the one or more console modules includes one or more module views, and wherein each console module and each module view is associated with one or more of a plurality of roles for one or more users; and employing the one or more console modules to provide the one or more data objects to one or more module views, wherein the one or more module views are associated with the one or more console modules;

providing a user interface to a user of one or more specific console modules that present specific module views as one or more different visualizations of the incident based on each role that corresponds to the user;

employing one of the one or more OCCs to provide one or more other resolution actions by the user to the operations engine, wherein the operations engine provides additional update information to the one or more console modules based on the one or more other resolution actions, and wherein each module view that corresponds to each role of one or more other users is automatically updated with the additional update information that is based on the one or more resolution actions by the user;

in response to a notification of a new incident, performing further actions, including:
employing cluster properties of historic time-frequency event data to train a heuristic model, wherein an output of the heuristic model provides one or more of a prediction of remediation metrics or a prediction of remediation information for the new incident; and
automatically determining one or more incident console modules that provide navigation of one or more causes of the new incident, wherein the one or more incident console modules are automatically included in the one or more OCCs, and wherein the one or more incident modules include one or more of the predicted remediation metrics or the predicted remediation information; and
employing geolocation information from a Global Positioning System (GPS) device at a client computer to determine one or more features that are included in the specific console module views for a user to improve the user's understanding of the views, wherein the features include one or more of time zones, languages, currencies, or calendar formatting that is displayed to the user of the client computer when the client computer is located at a particular geo-location.

23. The network computer of claim 22, wherein the operations engine performs further actions, comprising:
associating the user with the role based on a mapping of users to roles; and
selecting the one or more console modules based on the role that is associated with the user.

24. The network computer of claim 22, wherein employing the one or more console modules to provide the one or more data objects to the one or more module views, further comprises:
accumulating update information that is provided by the operations engine, wherein one or more values associated with the accumulated update information exceeds a defined threshold; and
providing the one or more data objects included in the accumulated update information to the one or more module views.

25. The network computer of claim 22, further comprising:
employing the one or more OCCs to authenticate the one or more users; and
employing the operations engine, to perform further actions, comprising:
identifying the one or more roles that correspond to the one or more users;
selecting the one or more console modules based on the one or more roles and the one or more users; and
deploying the one or more console modules on the one or more OCCs.

26. The network computer of claim 22, wherein employing the one of the one or more OCCs to provide the one or more other resolution actions to the operations engine further comprises:
employing the one or more module views to perform further actions, including:
displaying one or more user-interfaces based on the one or more data objects;
capturing one or more user-interface events based on one or more actions of a user; and
providing the one or more other resolution actions based on the one or more user-interface events and the one or more data objects.

27. The network computer of claim 22, wherein the one or more operations metrics associated with the incident, further comprises, one or more of, a time-to-resolve value, a number of responders required to resolve, one or more names of responders or teams required to resolve, or a priority of the incident in terms of operations and business impact.

28. The network computer of claim 22, further comprising, employing the operations engine to perform actions, including:
compiling the one or more console modules from one or more of source code, software libraries, objects, databases, executables, or configuration data;
bundling the one or more console modules and the one or more OCCs into one or more virtual machines; and
deploying the one or more virtual machines on one or more client computers or one or more network computers.

* * * * *